United States Patent
Shim

(10) Patent No.: US 9,252,603 B2
(45) Date of Patent: Feb. 2, 2016

(54) AUXILIARY POWER DEVICE, MEMORY SYSTEM HAVING THE SAME, AND CELL BALANCING METHOD THEREOF

(75) Inventor: Hojun Shim, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 472 days.

(21) Appl. No.: 13/217,962

(22) Filed: Aug. 25, 2011

(65) Prior Publication Data

US 2012/0062187 A1 Mar. 15, 2012

Related U.S. Application Data

(60) Provisional application No. 61/382,606, filed on Sep. 14, 2010.

(30) Foreign Application Priority Data

Sep. 13, 2010 (KR) .......................... 10-2010-0089613

(51) Int. Cl.
    *H02J 7/00* (2006.01)
    *H02H 3/10* (2006.01)
    *H02J 7/34* (2006.01)

(52) U.S. Cl.
    CPC ................ *H02J 7/0016* (2013.01); *H02H 3/10* (2013.01); *H02J 7/345* (2013.01)

(58) Field of Classification Search
    USPC ...................... 320/166–167, 118–119; 361/16
    See application file for complete search history.

(56) References Cited

U.S. PATENT DOCUMENTS

| | | | | |
|---|---|---|---|---|
| 4,805,063 | A * | 2/1989 | Kataoka et al. | 361/16 |
| 7,312,596 | B2 * | 12/2007 | Bolz et al. | 320/120 |
| 8,198,870 | B2 * | 6/2012 | Zuercher | 320/167 |
| 8,269,469 | B2 * | 9/2012 | Cegnar et al. | 320/167 |
| 8,294,428 | B2 * | 10/2012 | Kakiuchi | 320/166 |
| 2004/0263121 | A1 * | 12/2004 | Thrap | 320/119 |
| 2005/0052169 | A1 * | 3/2005 | Thrap | 323/282 |
| 2009/0015211 | A1 * | 1/2009 | Ribellino et al. | 320/167 |
| 2009/0024265 | A1 * | 1/2009 | Kortschak et al. | 701/22 |
| 2009/0230926 | A1 * | 9/2009 | Yang et al. | 320/167 |
| 2010/0039072 | A1 * | 2/2010 | Cegnar et al. | 320/167 |
| 2010/0109607 | A1 | 5/2010 | Zheng et al. | |
| 2010/0148582 | A1 * | 6/2010 | Carter | 307/48 |
| 2010/0148732 | A1 * | 6/2010 | Lynch | 320/166 |
| 2010/0289336 | A1 * | 11/2010 | Sugita | 307/66 |
| 2011/0175579 | A1 * | 7/2011 | Mazumdar | 320/167 |
| 2011/0204722 | A1 * | 8/2011 | Kim | 307/77 |
| 2011/0215770 | A1 * | 9/2011 | Belz | 320/160 |
| 2012/0068669 | A1 * | 3/2012 | Trainor et al. | 320/167 |

FOREIGN PATENT DOCUMENTS

| | | |
|---|---|---|
| JP | 2005-039993 | 2/2005 |
| KR | 10-2009-0097828 | 9/2009 |
| WO | WO 2009087956 A1 * | 7/2009 |

* cited by examiner

*Primary Examiner* — Richard Isla Rodas
*Assistant Examiner* — David V Henze-Gongola
(74) *Attorney, Agent, or Firm* — EIPG, PLLC

(57) ABSTRACT

An auxiliary power device includes an auxiliary power source having first and second charging cells connected in series, a cell balance circuit configured to sense a charging voltage between the first and second charging cells, generate a balance voltage based on the sensed charging voltage, and applies the generated balance voltage between the first and second charging cells, and a microprocessor configured to diagnose the first and second charging cells based on the sensed charging cells and control the cell balance circuit.

28 Claims, 20 Drawing Sheets

FIG. 4

| State | Diagonosis |
|---|---|
| A | C2 Short Error |
| B | C1 Over Deterioration Error |
| C | Normal Control |
| D | C2 Over Deterioration Error |
| E | C1 Short Error |

AUXILIARY POWER DEVICE, MEMORY SYSTEM HAVING THE SAME, AND CELL BALANCING METHOD THEREOF

CROSS-REFERENCE TO RELATED APPLICATIONS

This U.S. non-provisional patent application claims priority under 35 U.S.C. §119 of Korean Patent Application No. 10-2010-0089613, filed on Sep. 13, 2010, and U.S. provisional application No. 61/382,606, filed on Sep. 14, 2010, the entire contents of which are hereby incorporated by reference.

BACKGROUND

1. Field of the Invention

The present disclosure herein relates to an auxiliary power device, a memory system including the same, and a cell balancing method thereof.

2. Description of the Related Art

A user device includes storage devices, such as a memory card, a USB memory and a Solid State Drive (SSD), electronic devices, such as a personal computer, a digital camera, a camcorder, a cell phone, an MP3 player, a PMP and PDA, etc. Most of these user devices include a memory device for internally storing data. The memory device includes a volatile memory such as a DRAM and an SRAM, and a nonvolatile memory such as an EEPROM, an FRAM, a PRAM, an MRAM and a flash memory. The volatile memory loses stored data when the power is cut off; however, the nonvolatile memory keeps the data even if the power is cut off. The user device may include a power device as a power source.

SUMMARY

The present disclosure provides an auxiliary power device capable of preventing degradation of an auxiliary power source and extending its life and a memory system including the same.

The present disclosure also provides an auxiliary power device capable of improving data reliability and a memory system including the same.

Additional aspects and utilities of the present general inventive concept will be set forth in part in the description which follows and, in part, will be obvious from the description, or may be learned by practice of the present general inventive concept.

The forgoing and other features and utilities of the present general inventive concept may be achieved by providing a power storage apparatus including a first capacitor and a second capacitor which are connected in series, and a controller to apply a balance voltage to adjust a charging voltage between the first capacitor and the second capacitor.

The controller may determine characteristics of the first capacitor and the second capacitor according to the charging voltage and generates the balance voltage according to the determined characteristics of the first capacitor and the second capacitor.

The first capacitor and the second capacitor may be connected between a first potential and a second potential, and the balance voltage may be within a voltage range from a half of a difference between the first potential and the second potential.

The charging voltage may include a first charging voltage indicating a first degradation of the first capacitor and a second charging voltage indicating a second degradation of the second capacitor, and the controller may determine the balance voltage between to the first charging voltage and the second charging voltage.

The charging voltage may represent a degradation state of at least one of the first capacitor and the second capacitor, and the balance voltage may be a voltage defined according to a non-degradation state of the first capacitor and the second capacitor.

The controller may determine the balance voltage according to a variation of the charging voltage with respect to at least one of a reference voltage and a time axis.

The charging voltage may be detected when the first capacitor and the second capacitor are charged or a period time after the first capacitor and the second capacitor have been charged.

The charging voltage may include a first charging voltage detected when charging of the first capacitor and the second capacitor is completed, and a second voltage detected a predetermined time after charging of the first capacitor and the second capacitor has been completed, and the controller may determine the balance voltage according to a relationship between the first charging voltage and the second voltage.

The controller may include a lookup table representing a relationship between the balance voltage and the charging voltage, and determine the balance voltage according to the lookup table.

The charging voltage may vary according to variable characteristics of the first capacitor and the second capacitor, and the controller may determine the balance voltage according to a variable charging voltage.

At least one of the first capacitor and the second capacitor may be a super capacitor array.

At least one of the first capacitor and the second capacitor may have a capacitance between 1 F and 20 F inclusive.

The controller may generate the balance voltage as a capacitor balancing voltage applied to a node between the first capacitor and the second capacitor.

The controller may output a signal indicating a characteristic of at least one of the first capacitor and the second capacitor according to a level of the charging voltage.

The characteristic may comprise a first characteristic representing a first error of the first capacitor according to the level of the charging voltage with respect to a first reference level and a second characteristic representing a second error of the second capacitor according to the level of the charging voltage with respect to a second reference level.

The first capacitor and the second capacitor may be connected between a potential difference, and the controller may generate the balance voltage lower than a half of the potential difference when the charging voltage is higher than the half of the potential difference such that the lower balance voltage is applied to a node between the first capacitor and the second capacitor.

The first capacitor and the second capacitor may be connected between a potential difference, and the controller generates the balance voltage higher than a half of the potential difference when the charging voltage is lower than the half of the potential difference such that the higher balance voltage is applied to a node between the first capacitor and the second capacitor.

The controller may generate the balance voltage higher than the charging voltage when the charging voltage is lower than a first reference voltage, and the controller may also generate the balance voltage lower than the charging voltage when the charging voltage is higher than a second reference voltage.

The controller may determine a time to apply the balance voltage to a node between the first capacitor and the second capacitor.

The controller may generate the balance voltage when the charging voltage is within a first range, and output a signal indicating a characteristic of at least one of the first capacitor and the second capacitor when the charging voltage is within a second range.

The second range may be disposed below the first range or above the first range according to status of the first capacitor and the second capacitor.

The balance voltage may not be applied to a node between the first capacitor and the second capacitor when the charging voltage is within the second range.

The controller may include a converter to convert the charging voltage into a digital signal, and a balance voltage generator to generate the balance voltage according to the digital signal.

The controller may apply the balance voltage to a node between the first capacitor and the second capacitor.

The controller may further include a voltage follower to receive the balance voltage from the balance voltage generator and to output the valance voltage to a node between the first capacitor and the second capacitor.

The balance voltage generator may include a second converter to convert the signal to a second digital signal such that the controller generates the balance voltage according to the second digital signal.

The valance voltage generator may include a digital potentiometer.

The voltage follower may include an operational amplifier to output the balance voltage according to the charging voltage and a feedback voltage from a node between the first capacitor and the second capacitor, a resistor to restrict a current flowing the node, and a switch connected between the resistor and the node to output the balance voltage according to an activation signal.

The forgoing and other features and utilities of the present general inventive concept may also be achieved by providing an electronic apparatus including a power storage apparatus comprising a first capacitor and a second capacitor connected in series, and a controller to apply a balance voltage to adjust a charging voltage between the first capacitor and the second capacitor such that the first capacitor and the second capacitor output an output voltage; a booster to boost the output voltage; a voltage regulator to receive the boosted output voltage to generate a power voltage to operate the power storage apparatus; and a processor to control the power storage apparatus.

The forgoing and other features and utilities of the present general inventive concept may also be achieved by providing a method of a power storage apparatus, the method including providing a first capacitor and a second capacitor connected in series, and applying a balance voltage to adjust a charging voltage between the first capacitor and the second capacitor.

The forgoing and other features and utilities of the present general inventive concept may also be achieved by providing a method of an electronic apparatus, the method including providing a power storage apparatus comprising a first capacitor and a second capacitor connected in series, and applying a balance voltage to adjust a charging voltage between the first capacitor and the second capacitor such that the first capacitor and the second capacitor output an output voltage, boosting the output voltage, generating a power voltage from the output voltage to operate the power storage apparatus, and controlling the power storage apparatus.

BRIEF DESCRIPTION OF THE DRAWINGS

The accompanying drawings are included to provide a further understanding of the present general inventive concept, and are incorporated in and constitute a part of this specification. The drawings illustrate exemplary embodiments of the present general inventive concept and, together with the description, serve to explain principles of the present general inventive concept. In the drawings:

FIG. 4 is a table showing a diagnosis result according to a level of a charging voltage illustrated in FIG. 3;

DETAILED DESCRIPTION OF THE EMBODIMENTS

Figure 1:
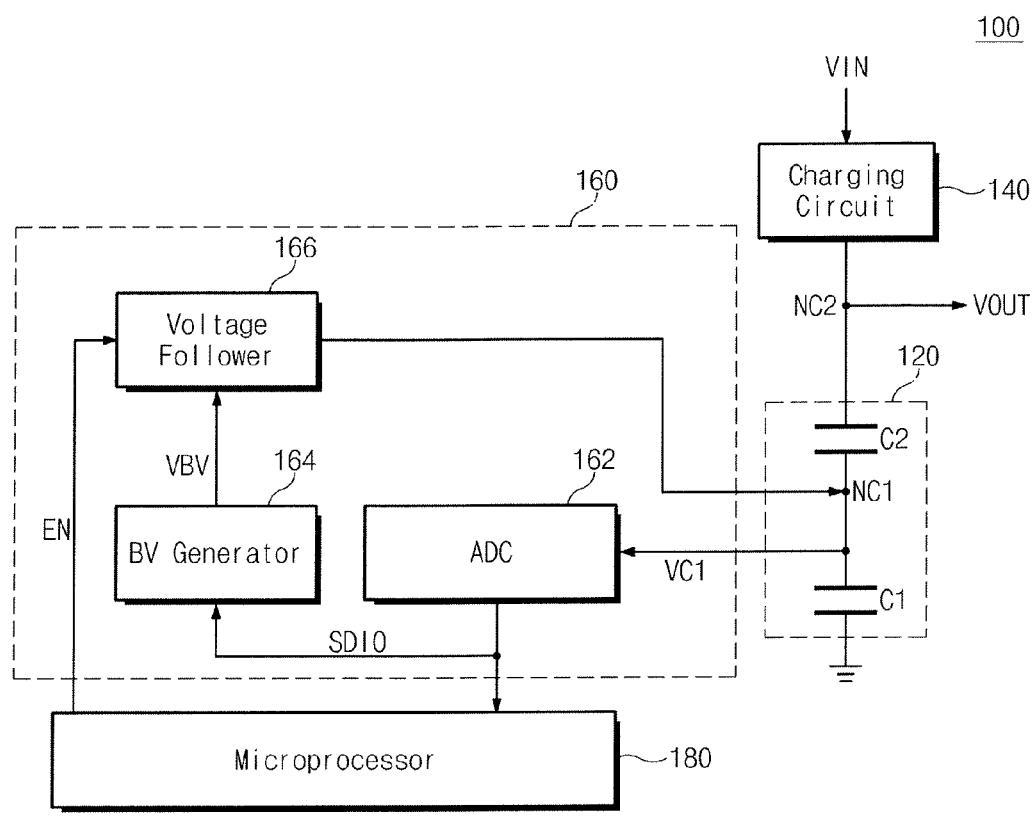
FIG. 1 is a diagram illustrating a first embodiment of an auxiliary power device according to the inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An auxiliary power device according to an embodiment of the inventive concept is provided with a microprocessor which controls a cell balance circuit. Herein, the cell balance circuit prevents degradation of charging cells and extends their lives by adjusting voltage among the charging cells connected in series.

FIG. 1 is a diagram illustrating an auxiliary power device 100 according to a first embodiment of the inventive concept. Referring to FIG. 1, the auxiliary power device 100 includes an auxiliary power source 120, a charging circuit 140, a cell balance circuit 160 and a microprocessor 180.

The auxiliary power source 120 includes charging cells C1 and C2 connected in series. In the embodiment, each of the charging cells C1 and C2 may be a super capacitor. Herein, the super capacitor is capable of storing a large amount of charge. In the embodiment, capacitance of the super capacitor may be about 1 F to about 20 F. A first node NC1 is a node between the charging cells C1 and C2, and a second node NC2 is a node where a voltage VOUT of the auxiliary power source 120 is outputted.

The charging cells C1 and C2 may be referred to as a capacitor unit formed with a single capacitor or formed with a plurality of sub-cells or a plurality of sub-capacitors. The general inventive concept is not limited thereto.

The auxiliary power source 120 illustrated in FIG. 1 is implemented with the two charging cells C1 and C2. However, the auxiliary power source according to the inventive concept is not limited to this. The auxiliary power source according to the inventive concept includes at least one charge cell connected in series.

The charging circuit 140 is supplied with a power supply voltage VIN from the outside and charges the auxiliary power source 120. That is, the charging circuit 140 supplies charges to the auxiliary power source 120. Herein, the outside may be various types of external or internal power supply device such as a DC power source, an AC power source, a rechargeable battery and the like. The charging circuit 140 may include an internal power supply device (not shown). In this case, the charging circuit 140 may charge the auxiliary power source 120 by using the internal power supply device.

Although not illustrated in the drawing, an output terminal having a one-way element may be included in the charging circuit 140. Herein, the one-way element prevents current or voltage outputted from the charging circuit 140 from flowing backward. In the embodiment, the one-way element may be a diode.

The cell balance circuit 160 includes an analog-to-digital converter (ADC) 162, a balance voltage generator 164 and a voltage follower 166. The cell balance circuit 160 prevents degradation of the charging cells C1 and C2 by adjusting voltage between the charging cells C1 and C2. The cell balance circuit 160 senses a voltage of the first node NC1 between the charging cells C1 and C2, converts the sensed voltage to a digital data SDIO, generates a balance voltage VBV based on the digital data SDIO, and applies the balance voltage VBV to the first node NC1. Also, the cell balance circuit 160 determines whether to apply the balance voltage VBV to the first node in response to an enabling signal EN.

The ADC 162 senses the voltage of the first node NC1, and converts the sensed voltage, i.e., a charging voltage VC1, to the digital data SDIO.

The balance voltage generator 164 receives the digital data SDIO, and generates the balance voltage VBV corresponding to the received digital data SDIO. Herein, the balance voltage VBV is a voltage for preventing degradation of the charging cells C1 and C2. In the embodiment, the balance voltage VBV corresponding to the digital data SDIO may be previously determined. In another embodiment, the balance voltage VBV corresponding to the digital data SDIO may be determined in real time by the microprocessor 180.

In the embodiment, the balance voltage generator 164 may be a digital-to-analog converter (DAC). In this case, the DAC is implemented such that the digital data SDIO is converted to the balance voltage VBV corresponding to the digital data SDIO.

In another embodiment, the balance voltage generator 164 may be a digital potentiometer. In this case, the digital potentiometer stores information related to the balance voltage VBV corresponding to the digital data SDIO. This stored information is changeable by the microprocessor 180.

The voltage follower 166 applies the balance voltage VBV outputted from the balance voltage generator 164 to the first node NC1 in response to the enabling signal EN. In other words, the voltage follower 166 is a voltage buffer of the balance voltage VBV.

The microprocessor 180 control an operation of the cell balance circuit 160. The microprocessor 180 receives the digital data SDIO outputted from the ADC 162, and generates the enabling signal EN.

The microprocessor 180 receives the digital data SDIO from the ADC 162 and may diagnose a state of the charging cells C1 and C2. That is, the digital data SDIO shows the state of the charging cells C1 and C2. For instance, when a level of the charging voltage VC1 corresponding to the digital data SDIO is very low, the first charging cell C1 is shorted. On the contrary, when the level of the charging voltage VC1 corresponding to the digital data SDIO is very high, the second charging cell C2 is shorted.

The microprocessor 180 may output state information (for instance, error information) of the charging cells C1 and C2 to the outside according to the digital data SDIO.

The microprocessor 180 may determine whether to generate the balance voltage VBV according to the digital data SDIO. For instance, when the digital data SDIO exists within a predetermined range, the microprocessor 180 may operate the balance voltage generator 164.

Although not illustrated, a pin for receiving the digital data SDIO and a pin for outputting the enabling signal EN are included in the microprocessor 180.

In the embodiment, the microprocessor 180 may output the enabling signal EN by using a General Purpose IO (GPIO), or may receive or output the digital data SDIO by using a serial interface (I2C/SPI interface) pin.

A general auxiliary power device applies a constant voltage to each charging cell not considering initial characteristics difference and degradation degree of the charging cells connected in series, and thus lives of the charging cells may be shortened. On the contrary, the auxiliary power device 100 according to the embodiment of the inventive concept diagnoses the initial characteristics difference or degradation degree of the charging cells connected in series and apply the balance voltage VBV between the charging cells according to a result of the diagnosis so that degradation of the charging cells may be prevented and lives of them may be extended.

Further, the auxiliary power device 100 according to the embodiment of the inventive concept exactly diagnoses a defect such as open/short of each of the charging cells connected in series, and thus reliability of a data storage device depending on the auxiliary power device 100 is improved.

In addition, since the auxiliary power device 100 according to the embodiment of the inventive concept generates the balance voltage VBV based on the digital data SDIO corresponding to the charging voltage VC1 between the charging cells C1 and C2, the charging cells C1 and C2 may be more carefully managed.

The cell balance circuit 160 and the microprocessor 180 may be formed in a single monolithic body. However, the present general inventive concept is not limited thereto. The call balance circuit 160 may have terminals to be detachably attached (connected) to terminals of the auxiliary power source 120 to transmit the signals (voltages) VC1 and VBV. It is possible that the cell balance circuit 160 and the microprocessor 180 may be provided in a housing of the auxiliary power source 120. When at least one of the cell balance circuit 160 and the microprocessor 180 is located together wither the auxiliary power source 120, a material unit (not illustrated) can be provided between the auxiliary power source 120 and at least one of the cell balance circuit 160 and the microprocessor 180 to prevent a heat transfer. In this case, the signals (voltages) VC1 and VBV can be transmitted through the terminals or conductive lines connected thereto.

Figure 2:
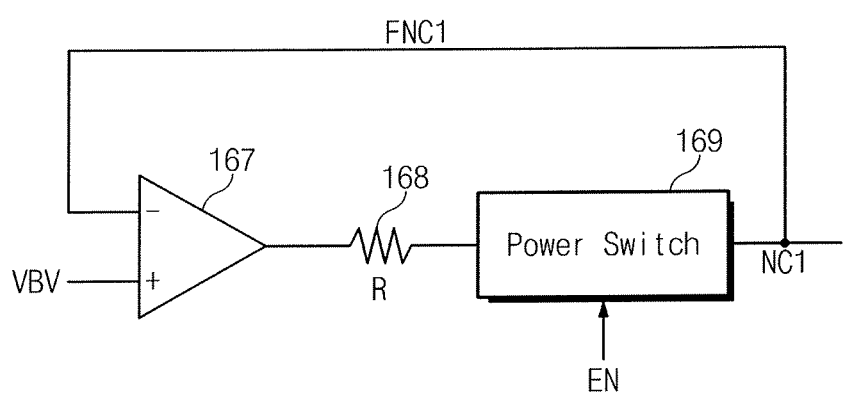
FIG. 2 is a diagram illustrating an embodiment of a voltage follower illustrated in FIG. 1.

FIG. 2 is a diagram illustrating an embodiment of the voltage follower 166 illustrated in FIG. 1. Referring to FIG. 2, the voltage follower 166 includes an operational amplifier 167, a resistor 168 and a power switch 169.

The operational amplifier 167 receives the balance voltage VBV and a feedback voltage FNC1 of the first node NC1 through a positive input terminal (+) and a negative input terminal (−) respectively to perform an amplifying operation.

One terminal of the resistor 168 is connected to an output terminal of the operational amplifier 167, and the resistor 168 has a resistance value R for limiting output current of the operational amplifier 167. Herein, the limitation of the output current of the operational amplifier 167 prevents possible damage or overheating which shortens a life of the operational amplifier 167.

The power switch 169 is connected between the other terminal of the resistor 168 and the first node NC1, and switched in response to the enabling signal EN. Herein, the enabling signal EN is generated from the microprocessor 180 (refer to FIG. 1).

The voltage follower 166 according to the embodiment of the inventive concept may supply the balance voltage VBV to the first node NC1 in response to the enabling signal EN.

The voltage follower 166 illustrated in FIG. 2 is implemented with the operational amplifier 167. However, the voltage follower according to the inventive concept is not limited to this. The voltage follower according to the inventive concept is possibly implemented with various active or passive elements.

Although the balance voltage VBV is transmitted to the node NC1 through the voltage follower 166 and the power switch 169, it is possible that a predetermined voltage corresponding to the balance voltage VBV can be applied to the node NC1. The predetermined voltage may be the same as the balance voltage VBV. However, the present general inventive concept is not limited thereto. The predetermined voltage may be different from the balance voltage VBV. However, the predetermined voltage and the balance voltage VBV may be a voltage required at the node NC1 to prevent degradation of the auxiliary power source 120 and to extend its life span and a memory system according to the present general inventive concept.

Figure 3A:
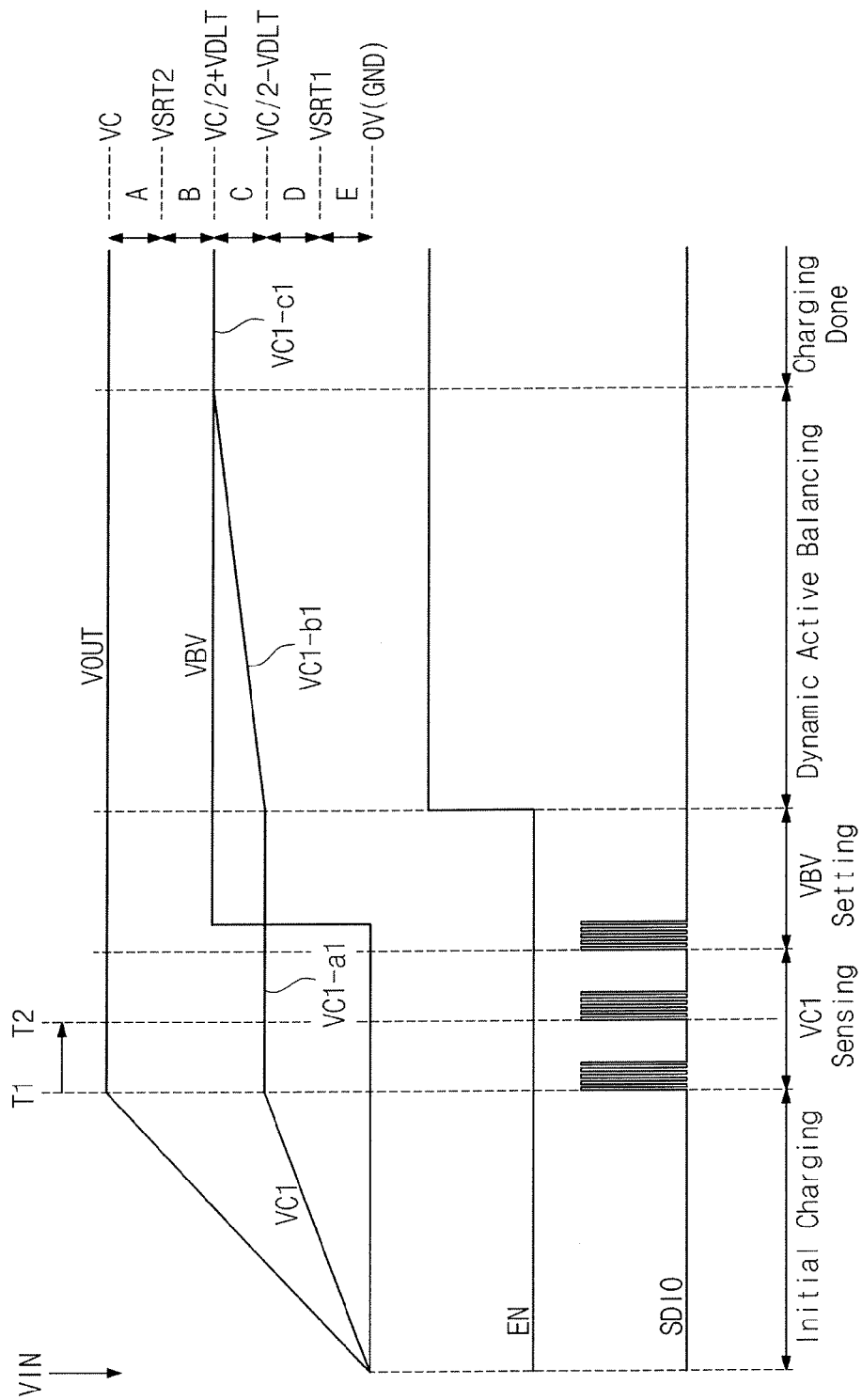
FIGS. 3A, 3B, and 3C are diagrams illustrating an operation of an auxiliary power device illustrated in FIG. 1.
Figure 3B:
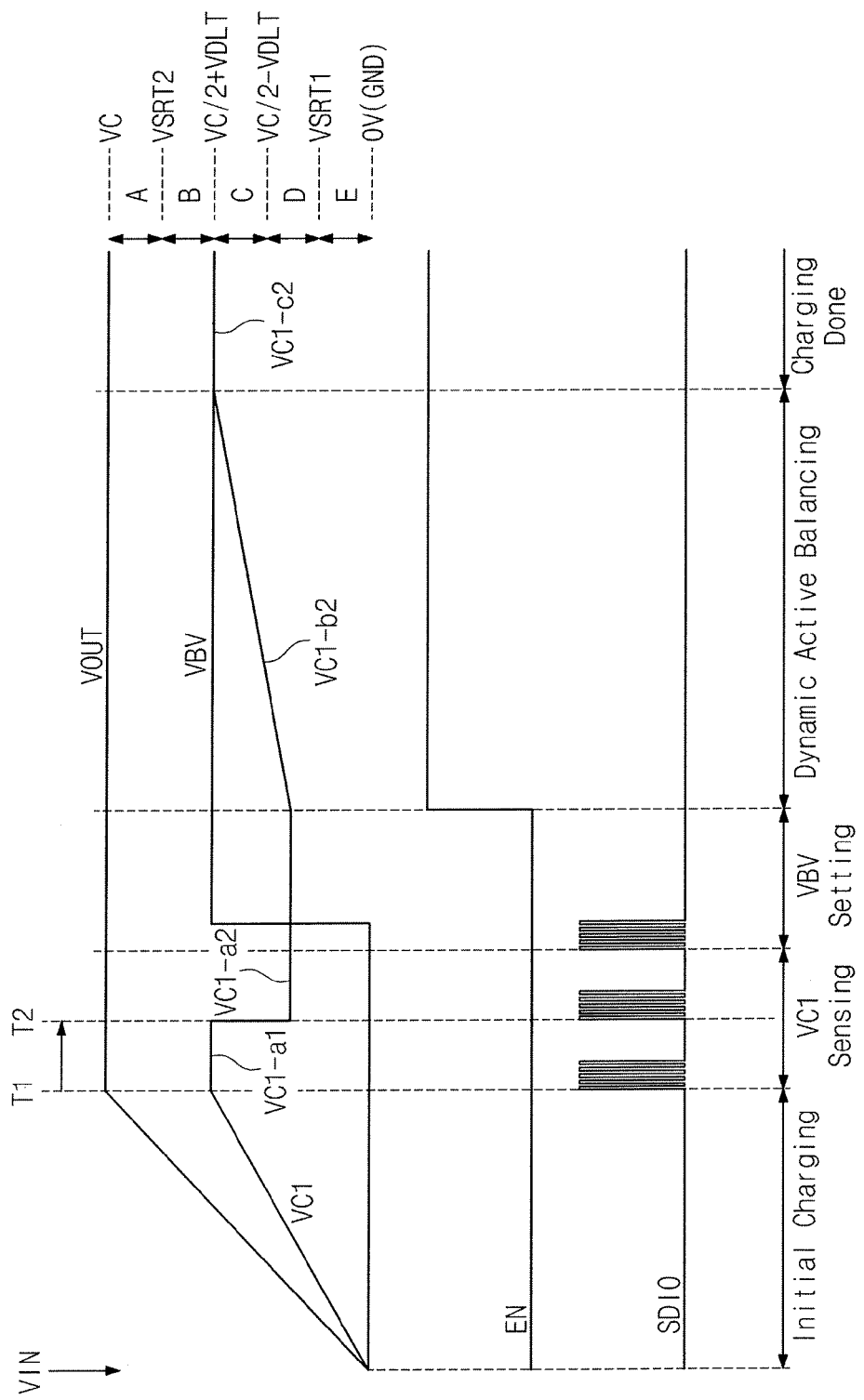
Figure 3C:
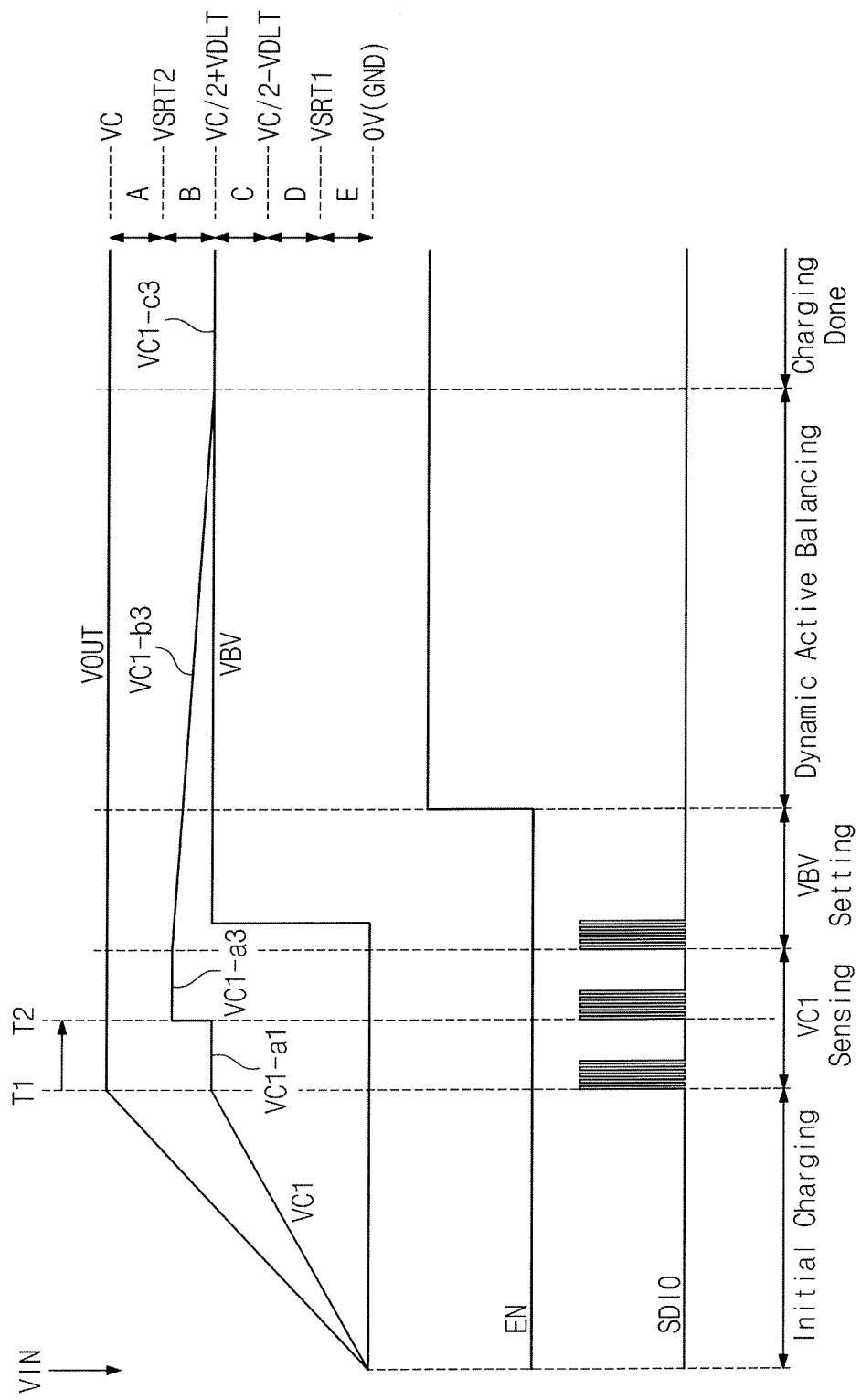

FIGS. 3A, 3B, and 3C are diagrams illustrating an operation of the auxiliary power device 100 illustrated in FIG. 1. Referring to FIGS. 1 to 3C, an operation method of the auxiliary power device 100 roughly includes an initial charging operation, a charging voltage sensing operation, a balance voltage configuring (setting) operation, a balance voltage applying (dynamic active balancing) operation, and a charging completion operation.

The initial charging operation is performed until a level of the output voltage VOUT becomes a target value VC. In the initial charging operation, if the external power supply voltage VIN is supplied, the charging circuit 140 starts to charge the auxiliary power source 120. Accordingly, the output voltage VOUT of the auxiliary power source is gradually increased, and the charging voltage VC1 between the charging cells C1 and C2 is also increased. If the charging cells C1 and C2 are in an ideal state, the charging voltage VC1 is half of the output voltage VOUT.

In the initial charging operation, the enabling signal EN is in a low level state, and the cell balance circuit 160 is not operated. Therefore, the digital data SDIO is not outputted.

In the charging voltage sensing operation, the ADC 162 senses the voltage of the first node NC1, and converts the sensed charging voltage VC1 to the digital data SDIO. Herein, the sensed charging voltage VC1 indicates the degradation degree of the charging cells C1 and C2. Also, the digital data SDIO is a serial data and transferred to the microprocessor 180.

In the balance voltage configuring operation, the microprocessor 180 transfers the digital data SDIO to the balance voltage generator 164, and the balance voltage generator 164 receives the transferred digital data SDIO and generates the balance voltage VBV.

In the balance voltage applying operation, the microprocessor 180 makes the enabling signal EN become in a high level state. Accordingly, the power switch 169 is turned-on, and the balance voltage VBV is applied to the first node NC1.

The charging completion operation is done when the charging voltage VC1 between the charging cells C1 and C2 becomes the same as the balance voltage VBV.

The VC1 sensing operation can be performed at a time T1 and/or a time T2. A voltage VC1-$a1$ can be the same as the charging voltage VC1 at the time T1 as illustrated in FIG. 3A. However, a voltage VC1-$a2$ and VC1-$a3$ at the time T2 may be different from the voltage VC1-$a1$ at the time T1 or T2, as illustrated in FIGS. 3B and 3C, respectively, due to a change of a characteristic of the auxiliary power source 120, for example, a short circuit, a degrading state, etc.

When the balancing voltage VBV is applied to the node NC1, a voltage VC1-$b1$, VC1-$b2$, and VC1-$b3$ can be changed to a required voltage, such as a voltage VC1-$c1$, VC1-$c2$, and VC1-$c3$, respectively, corresponding to the state C.

A voltage level of the VC1 at the time T1 or a voltage level change of the VC1-$a1$ at the time 2, during a period between the times T1 and T2, or during the VC1 sensing operation can represent a characteristic of the auxiliary power source 120, respective characteristics of the charging cells C1 and C2, or a difference between the characteristics of the charging cells C1 and C2 of the auxiliary power source 120.

A voltage range of the state C may vary according to a number of cells of the auxiliary power source 120 or may be adjusted according to characteristics of the cells of the auxiliary power source 120.

According to the operation method of the auxiliary power device 100 according to the inventive concept, the balance voltage VBV corresponding to the digital data SDIO is generated, and the balance voltage VBV is outputted by the enabling signal EN.

FIG. 4 is a table showing the diagnosis result according to the level of the charging voltage VC1 illustrated in FIG. 3. Referring to FIGS. 3 and 4, the diagnosis result according to the level of the charging voltage VC1 is as follows.

When the level of the charging voltage VC1 is from VSRT2 to VC (A), it is diagnosed that the charging cell C2 is shorted. Herein, this result value may be reported as an error to the outside. Herein, the level VSRT2 is a value which indicates that the charging cell C2 is shorted.

When the level of the charging voltage VC1 is from VC/2+ VDLT to VSRT2 (B), it is diagnosed that the charging cell C1 is seriously degraded because the capacitance of the charging cell C1 is excessively reduced. Here, the level VDLT is a half of a controllable voltage level section. Herein, this result value may be reported as an error to an outside thereof to indicate a characteristic of the auxiliary power source 120.

The controllable voltage level section corresponding to the level VDLT may be a voltage range of the state C or a voltage range between voltages at the node NC1 to indicate errors (defects, shorts, degradations, capacitance changes, etc.) of the respective cells C1 and C2. The controllable voltage level section may be determined according to designs of the cells C1 and C2 or environments in which the cells C1 and C2 are used.

When the level of the charging voltage VC1 is from VC/2−VDLT to VC/2+VDLT (C), it is diagnosed that the charging cells C1 and C2 are normally adjusted. If the level of the charging voltage VC1 is lower than VC/2, the degradation of the charging cell C2 is more progressed that that of the charging cell C1, and thus the balance voltage VBV is adjusted so that lower voltage is applied to the charging cell C2. On the contrary, if the level of the charging voltage VC1 is higher than VC/2, the degradation of the charging cell C1 is more progressed that that of the charging cell C2, and thus the balance voltage VBV is adjusted so that lower voltage is applied to the charging cell C1.

When the level of the charging voltage VC1 is from VSRT1 to VC/2−VDLT (D), it is diagnosed that the charging cell C2 is seriously degraded because the capacitance of the charging cell C2 is excessively reduced. Herein, this result value may be reported as an error to the outside.

When the level of the charging voltage VC1 is from about 0V to VSRT1 (E), it is diagnosed that the charging cell C1 is shorted. Herein, this result value may be reported as an error to the outside. Herein, the level VSRT1 is a value which indicates that the charging cell C1 is shorted. Meanwhile, it is possible that not only the charging cell C1 but also the charging cell C2 is shorted at the same time.

The auxiliary power device 100 illustrated in FIG. 1 includes the microprocessor 180 which receives the digital data SDIO from the ADC 162 and has one serial interface pin to output the received digital data SDIO to the balance voltage generator 164. However, the microprocessor according to the inventive concept is not limited to this.

Figure 5:
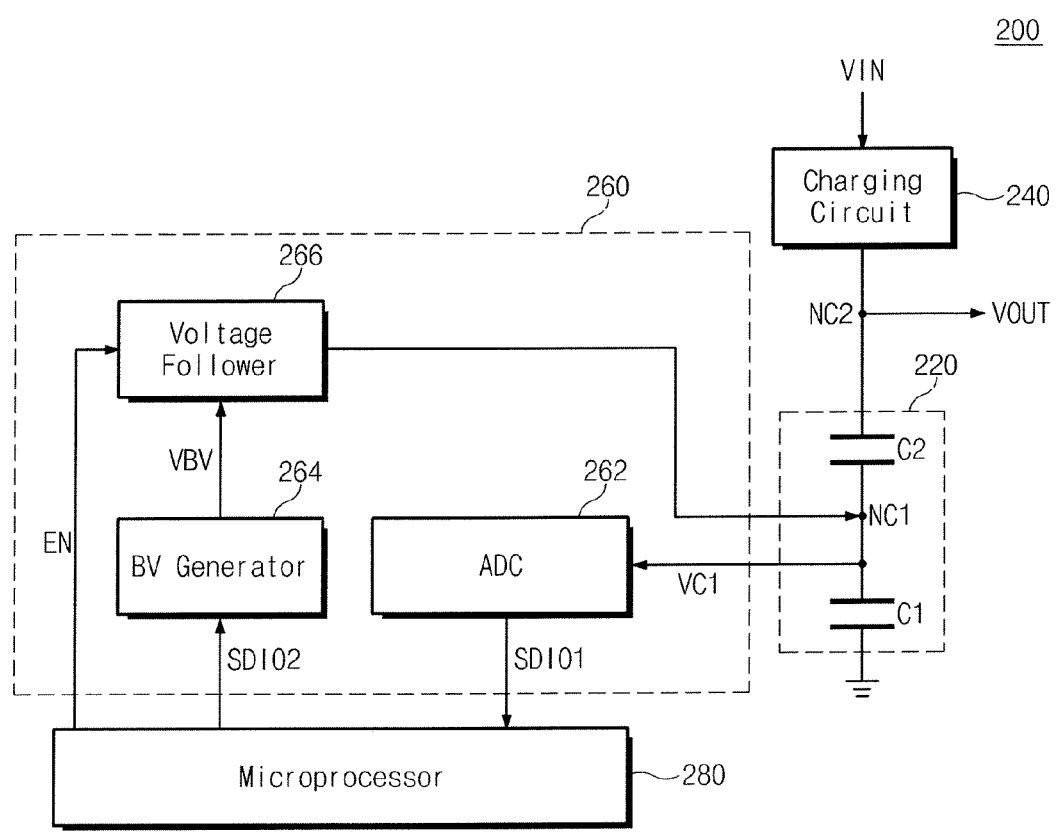
FIG. 5 is a diagram illustrating a second embodiment of an auxiliary power device according to the inventive concept.

FIG. 5 is a diagram illustrating an auxiliary power device 200 according to a second embodiment of the inventive concept. Referring to FIG. 5, the auxiliary power device 200 includes a microprocessor 280 to communicate with a cell balancing unit 260. The microprocessor 280 is provided with a first serial interface pin to receive a first digital data SDIO1 from an ADC 262 and a second serial interface pin to output a second digital data SDIO2 to a balance voltage generator 264.

The microprocessor 280 receives the first digital data SDIO1 from the ADC 262 through the first serial interface pin, generates the second digital data SDIO2 corresponding to the first digital data SDIO1, and outputs the generated second digital data SDIO2 to the balance voltage generator 264 through the second serial interface pin.

In the embodiment, the microprocessor 280 may generate the second digital data SDIO2 corresponding to the first digital data SDIO1 by an internally stored program thereof. Herein, the program may determine whether to finely/coarsely control the balance voltage generator 264 according to the first digital data SDIO1. For instance, when the first digital data SDIO1 corresponding to a desirable (or required) balancing state of cells of the charging cells C1 and C2 is inputted, the program may finely control the balance voltage generator 264.

In another embodiment, the microprocessor 280 receives the first digital data SDIO1, stores it, and may use the stored first digital data SDIO1 as the second digital data SDIO2.

The auxiliary power devices 100 and 200 illustrated in FIGS. 1 and 5 include two charging cells C1 and C2 connected in series. However, the embodiments of the inventive concept are not limited to this. The auxiliary power device according to the inventive concept may include three (3) or more charging cells connected in series.

Figure 6:
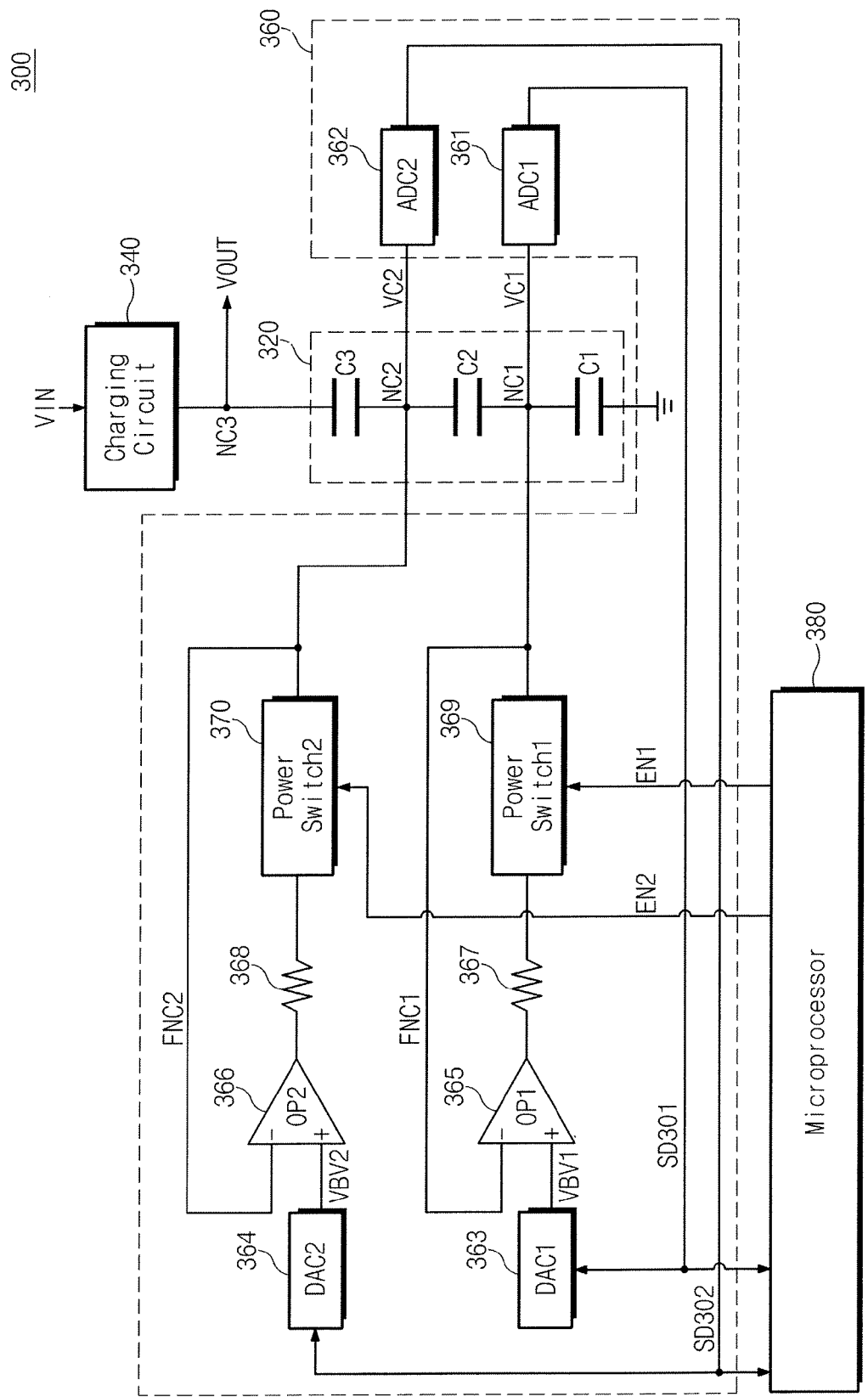
FIG. 6 is a diagram illustrating a third embodiment of an auxiliary power device according to the inventive concept.

FIG. 6 is a diagram illustrating an auxiliary power device 300 according to a third embodiment of the inventive concept. Referring to FIG. 6, the auxiliary power device 300 includes an auxiliary power source 320 having 3 charging cells C1 to C3 at least one of which is connected in series, a charging circuit 340 for charging the auxiliary power source 320, a cell balance circuit 360 for preventing degradation of the charging cells C1 to C3, and a microprocessor 380 for controlling the cell balance circuit 360.

The cell balance circuit 360 includes first and second ADCs 361 and 362, first and second DACs 363 and 364, first and second operational amplifiers 365 and 366, first and second resistors 367 and 368, and first and second power switches 369 and 370.

The first ADC 361 senses a charging voltage VC1 of a first node NC1, and converts the sensed voltage VC1 to a first digital data SD301. Herein, the first digital data SD301 is transferred to the first DAC 363 through the microprocessor 380. The first DAC 363 generates a first balance voltage VBV1 corresponding to the first digital data SD301. This generated first balance voltage VBV1 is inputted to a positive terminal of the first operational amplifier 365, and a first feedback voltage FNC1 of the first node NC1 is inputted to a negative input terminal of the first operational amplifier 365. An output terminal of the first operational amplifier 365 is connected to one terminal of the first resistor 367. The first power switch 369 switches the other terminal of the first resistor 367 and the first node NC1 in response to a first enabling signal EN1. Accordingly, the first balance voltage VBV1 is applied to the first node NC1.

The second ADC 362 senses a charging voltage VC2 of a second node NC2, and converts the sense voltage VC2 to a second digital data SD302. Herein, the second digital data SD302 is transferred to the second DAC 364 through the microprocessor 380. The second DAC 364 generates a second balance voltage VBV2 corresponding to the second digital data SD302. This generated second balance voltage VBV2 is inputted to a positive terminal of the second operational amplifier 366, and a second feedback voltage FNC2 of the second node NC2 is inputted to a negative input terminal of the second operational amplifier 366. An output terminal of the second operational amplifier 366 is connected to one terminal of the second resistor 368. The second power switch 370 switches the other terminal of the second resistor 368 and the second node NC2 in response to a second enabling signal EN2. Accordingly, the second balance voltage VBV2 is applied to the second node NC2.

As above-described, the auxiliary power device 300 may prevent degradation of the charging cells C1 to C3 by applying the first and second balance voltages VBV1 and VBV2 to the first and second nodes NC1 and NC2.

The auxiliary power devices 100 to 300 illustrated in FIGS. 1, 5 and 6 include the voltage followers 365, 367 and 369, and 366, 368 and 370. However, the auxiliary power device according to the inventive concept does not indispensably need to include the voltage follower.

Figure 7:
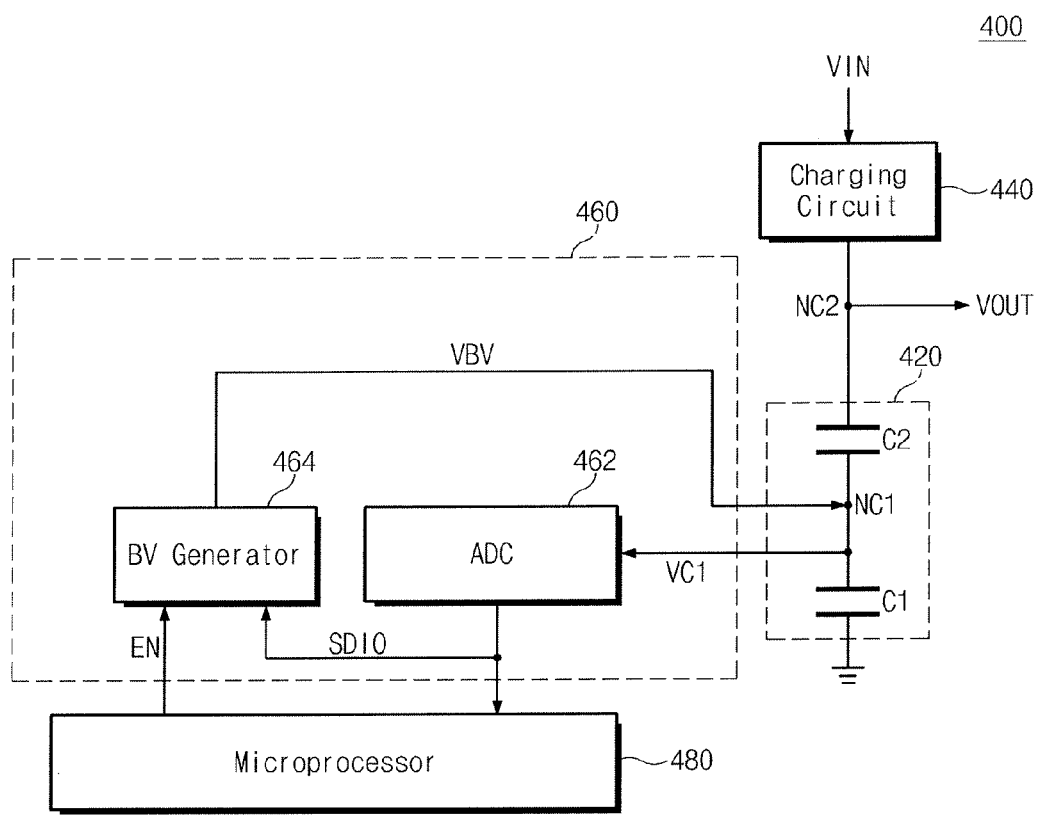
FIG. 7 is a diagram illustrating a fourth embodiment of an auxiliary power device according to the inventive concept.

FIG. 7 is a diagram illustrating an auxiliary power device 400 according to a fourth embodiment of the inventive concept. Referring to FIG. 7, the auxiliary power device 400 does not include the voltage follower in comparison with the auxiliary power device 100 illustrated in FIG. 1.

An auxiliary power source 420 includes charging cells C1 and C2 connected in series. A first node NC1 is between the charging cells C1 and C2. A voltage VOUT of the auxiliary power source 420 is outputted to a second node NC2.

A charging circuit 440 is supplied with a power supply voltage VIN form the outside, and charges the auxiliary power source 420.

A cell balance circuit 460 includes an ADC 462 and a balance voltage generator 464. The cell balance circuit 460 prevents degradation of the charging cells C1 and C2 by applying a balance voltage VBV between the charging cells C1 and C2.

The ADC 462 senses a voltage of the first node NC1, and converts the sensed charging voltage VC1 to a digital data SDIO.

The balance voltage generator 464 receives the digital data SDIO, and generates the balance voltage VBV corresponding to the received digital data SDIO in response to an enabling signal EN. Herein, the enabling signal EN is inputted by a micro processor 480.

The microprocessor 480 controls an operation of the cell balance circuit 460. The microprocessor 480 receives the digital data SDIO outputted from the ADC 462, and generates the enabling signal EN.

The auxiliary power device 400 according to the embodiment of the inventive concept includes the balance voltage generator 464 operated in response to the enabling signal EN generated by the microprocessor 480.

The auxiliary power devices illustrated in FIGS. 1 to 7 include the microprocessor which controls the cell balance circuit. However, the embodiment of the inventive concept does not indispensably need the microprocessor. The auxiliary power device according to the inventive concept is possibly implemented with a digital potentiometer which digitally diagnoses the state of the charging cell and applies the balance voltage according to the diagnosis result.

Figure 8:
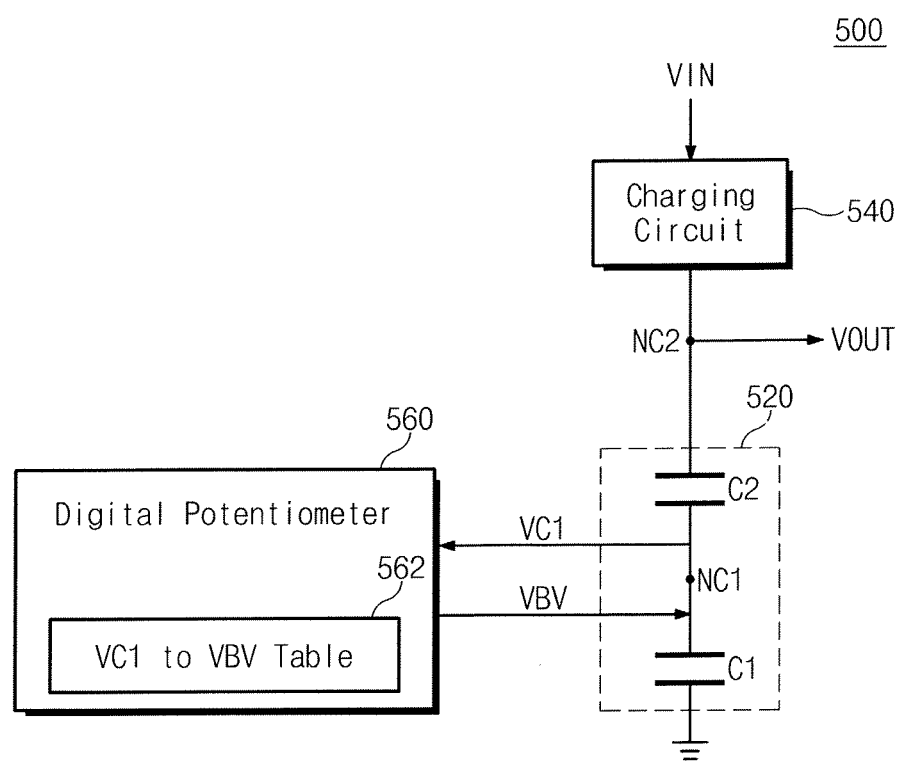
FIG. 8 is a diagram illustrating a fifth embodiment of an auxiliary power device according to the inventive concept.

FIG. 8 is a diagram illustrating an auxiliary power device 500 according to fifth embodiment of the inventive concept. Referring to FIG. 8, the auxiliary power device 500 includes an auxiliary power source 520, a charging circuit 540 and a digital potentiometer 560.

The auxiliary power source 520 includes charging cells C1 and C2 connected in series. The charging circuit 540 is supplied with a power supply voltage VIN from the outside, and charges the auxiliary power 520.

The digital potentiometer 560 senses a charging voltage VC1 between the charging cells C1 and C2, generates a balance voltage VBV corresponding to the sensed charging voltage VC1 by using a table 562, and applies the generated balance voltage VBV to a node NC1. Herein, the digital potentiometer 560 senses the charging voltage VC1, converts it to a digital value, and generates the balance voltage VBV corresponding to the digital value.

In the embodiment, the table 562 stores information related to the balance voltage VBV corresponding to the charging voltage VC1. Herein, the table may be changeable by a user.

The auxiliary power device 500 according to the embodiment of the inventive concept is provided with the digital potentiometer 560 which digitally diagnoses the state of the charging cells C1 and C2 through the charging voltage VC1 and applies the balance voltage VBV according to the diagnosis result, and thus degradation of the charging cells C1 and C2 may be prevented and their lives may be extended in a simple way.

Figure 9:
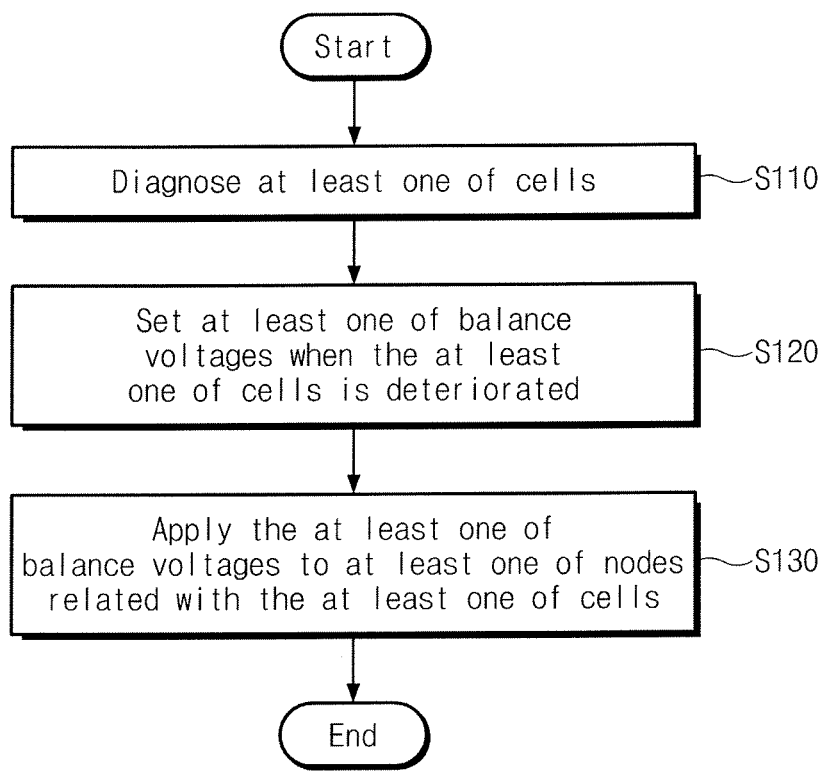
FIG. 9 is a flow chart illustrating a cell balance method of the auxiliary power device according to the inventive concept.

FIG. 9 is a flow chart illustrating a cell balance method of the auxiliary power device according to the inventive concept. Referring to FIG. 9, the cell balance method of the auxiliary power device is as follows.

The auxiliary power device diagnoses the degradation state of the charging cells at least one of which is connected in series (S110). Herein, the auxiliary power device may be one of the auxiliary power device 100 illustrated in FIG. 1, the auxiliary power device 200 illustrated in FIG. 5, the auxiliary power device 300 illustrated in FIG. 6, and the auxiliary power device 400 illustrated in FIG. 7. Herein, the auxiliary power device senses at least one charging voltage among the charging cells, converts the sensed at least one charging cells to the digital data, and determines the degradation state according to the digital data. For instance, as illustrated in FIG. 4, the degradation degree of the charging cells may be determined according to what state the digital data is in among A, B, C, D and E.

As a result of the diagnosis of the charging cells, when at least one charging cell is degraded, the auxiliary power device configures at least one balance voltage so that the at least one charge cell is not degraded any more (S120). For instance, as above-describe referring to FIG. 4, if the level of charging voltage VC1 is lower than VC/2, degradation of the charging cell C2 is more progressed than that of the charging cell C1, and thus the balance voltage VBV is configured so that lower voltage is applied to the charging cell C2. On the contrary, if the level of the charging voltage VC1 is higher than VC/2, degradation of the charging cell C1 is more progressed than that of the charging cell C2, and thus the balance voltage VBV is configured so that lower voltage is applied to the charging cell C1.

The auxiliary power device applies the configured at least one balance voltage to at least one node related to the at least one charging cell (S130).

According to the charging cell balance method of the auxiliary power device according to the embodiment of the inventive concept, the state of the charging cell is digitalized and diagnosed, and the balance voltage VBV is generated and applied according to the diagnosis result.

The auxiliary power devices described referring to FIGS. 1 to 9 adjust the charging voltage between the charging cells connected in series. However, the embodiment of the inventive concept is not limited to this. The embodiment of the inventive concept may be implemented so that the state of at least one charging cell is diagnosed, and the balance voltage is compulsorily applied to one terminal or the other terminal of the at least one charging cell.

The above-described auxiliary power devices according to the embodiments of the inventive concept are possibly applied to a Solid State Driver (SSD).

Figure 10:
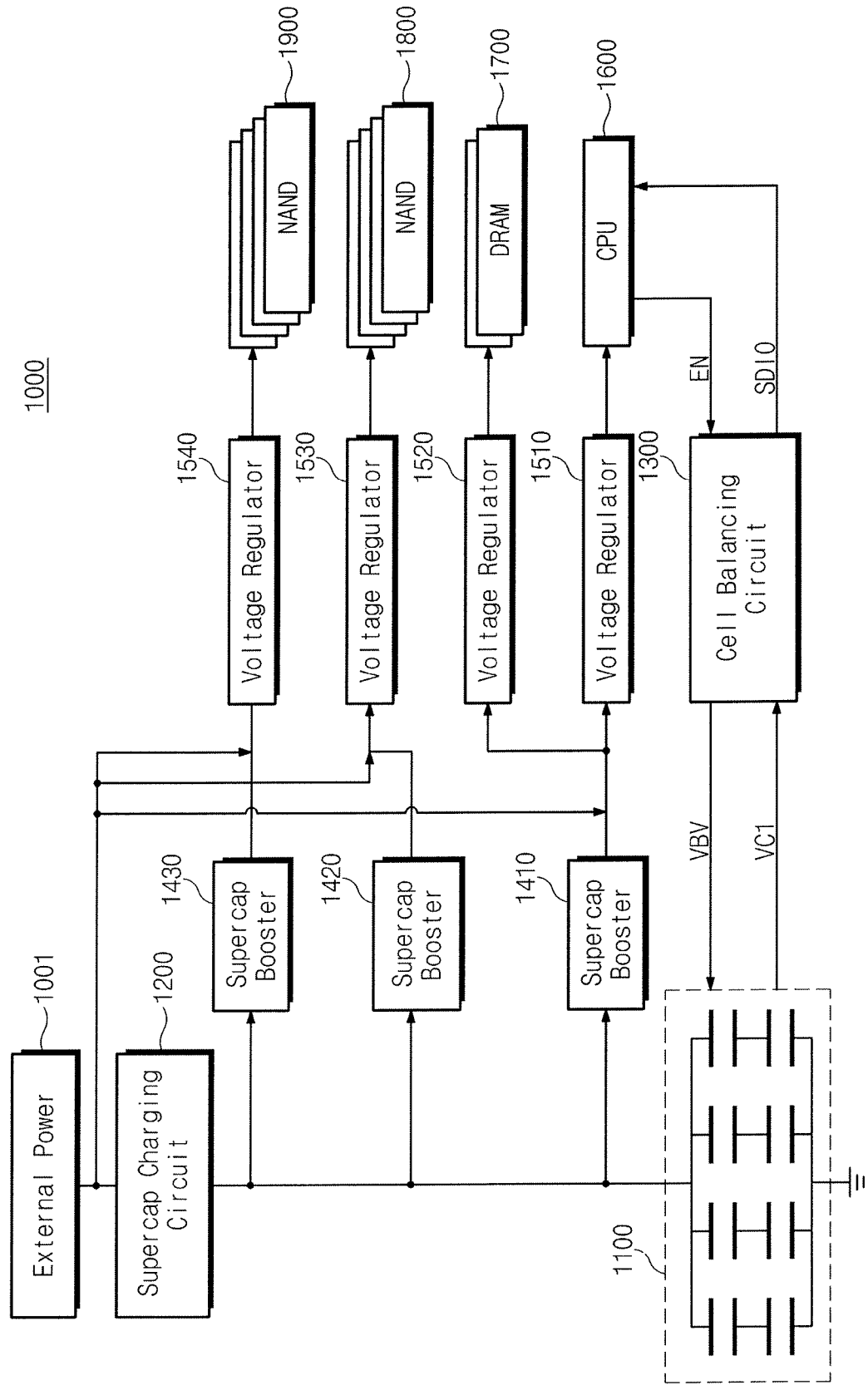
FIG. 10 is a block diagram illustrating an SSD according to an embodiment of the inventive concept.

FIG. 10 is a block diagram illustrating an SSD 1000 according to an embodiment of the inventive concept. Referring to FIG. 10, the SSD 1000 includes an external power 1001, a supercap (or super capacitor) array 1100, a supercap charging circuit 1200, a cell balance circuit 1300, supercap boosters 1410 to 1430, voltage regulators 1510 to 1540, a Central Processing Unit (CPU) 1600, at least one DRAM 1700, at least one first NAND 1800, and at least one second NAND 1900.

The external power 1001 is supplied with power from an outside thereof, and supplies the power to the inside of the SSD 1000. For instance, the external power 1001 supplies the power to the supercap charging circuit 1200 and the voltage regulators 1510 to 1540. Although not illustrated, an output terminal of the external power 1001 includes a one-way element to output a power to an external apparatus.

The supercap array 1100 is a group of super capacitors. Herein, the super capacitors may be arranged so that at least one of them is connected in series and at least one of them is connected in parallel. In the case of the supercap array 1100 illustrated in FIG. 10, 4 pairs of super capacitors connected in series are connected in parallel for convenience.

The supercap charging circuit 1200 is supplied with the power from the external power 1001, and charges the supercap array 1100. Although not illustrated, an output terminal of the supercap charging circuit 1200 includes a one-way element.

For preventing degradation of the super capacitors of the supercap array 1100 and extending their lives, the cell balance circuit 1300 senses a charging voltage VC between the super capacitors connected in series, converts the sensed charging voltage VC1 to a digital data SDIO, generates a balance voltage VBV based on the digital data SDIO, and applies the generated balance voltage VBV between the super capacitors connected in series in response to an enabling signal EN.

Each of the supercap boosters 1410 to 1430 receives an output voltage of the supercap array 110, and boosts it to the voltage provided to the inside of the SSD 1000. Although not illustrated, each output terminal of the supercap boosters 1410 to 1430 includes a one-way terminal.

Each of the voltage regulators 1510 to 1540 is supplied with power from at least one of the supercap boosters 1410 to 1430, and generates a voltage for diving internal chips (for instance, CPU, DRAM and NAND) of the SSD 1000.

The CPU 1600 controls an overall operation of the SSD 1000. The CPU 1600 receives a command from the outside, determines whether to store data into at least one of the first and second NANDS 1800 and 1900 or read out data from at least one of the first and second NANDS 1800 and 1900, and controls it.

Also, the CPU 1600 controls the cell balance circuit 1300. The CPU 1600 may perform a serial communication with the cell balance circuit 1300. The CPU 1600 receives the digital data SDIO from the cell balance circuit 1300, and outputs the enabling signal EN to the cell balance circuit 1300.

At least one DRAM 1700 may store data generated during data input/output of the at least one NANDs 1800 and 1900, or store temporary data generated during operation of the CPU 1600.

The at least one first and second NANDs 1800 and 1900 are NAND flash memory devices for storing data. In the embodiment, each of the at least one first and second NANDs 1800 and 1900 may be a single level cell NAND flash memory device. In another embodiment, each of the at least one first and second NANDs 1800 and 1900 may be a multi level cell NAND flash memory device.

The SSD 1000 according to the embodiment of the inventive concept is provided with the cell balance circuit 1300, and thus degradation of the supercap array 1100 is prevented and its life span is extended. Also, according to the extended life span of the supercap array 1100, improvement of data reliability of the SSD 1000 is expected.

The SSD 1000 provided with the cell balancing circuit 1300 can communicate with the CPU 1600 to perform an operation of an auxiliary power device as illustrated in FIGS. 1 through 9. The cell balancing circuit 1300 may be formed in at least one of the SSD 1000 or the CPU 1600. The SSD 1000 may have a housing in which the cell balancing circuit 1300 is disposed to communicate with the super capacitors of the SSD 1100 and also communicate with the CPU 1600 through terminals thereof so that the operation of the auxiliary power device can be performed.

Figure 11:
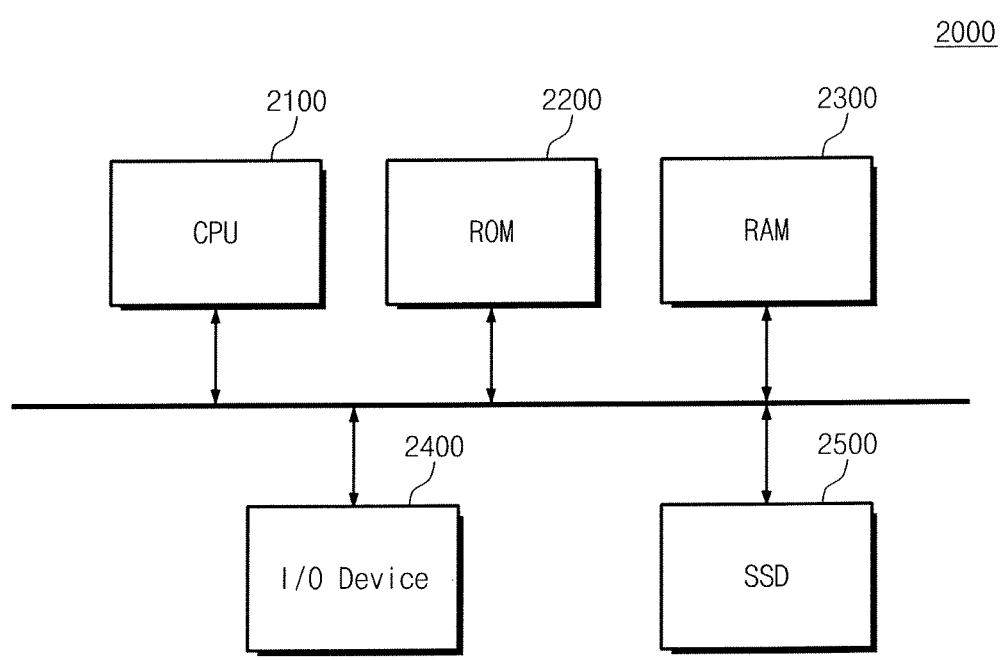
FIG. 11 is a block diagram illustrating a computing system provided with the SSD illustrated in FIG. 10.

FIG. 11 is a block diagram illustrating a computing system 2000 provided with the SSD 1000 illustrated in FIG. 10. Referring to FIG. 11, the computing system 2000 includes a CPU 2100, a ROM 2200, a RAM 2300, an input/output device 2400 and an SSD 2500.

The CPU 2100 is connected to a system bus. The ROM 2200 stores data needed for driving the computing system 2000. These data include an initiating command sequence, a basic input/output operation system (for instance, BIOS) sequence, or the like. The RAM 2300 temporarily stores data generated when the CPU 2100 is operated.

In the embodiment, the input/output device 2400 such as a keyboard, a pointing device (mouse), a monitor and a modem is connected to the system bus through an input/output device interface.

The SSD 2500 is a readable storage device and implemented in the same manner as the SSD 1000 illustrated in FIG. 10. The SSD 2500 may perform the same operation as the SSD 1100 of FIG. 10

The computing system 2000 according to the embodiment of the inventive concept stores a large amount of data into a nonvolatile memory device, i.e., the SSD 2500, and thus power consumption may be reduced. Accordingly, the computing system 2000 according to the embodiment of the inventive concept may greatly extend battery time.

Figure 12:
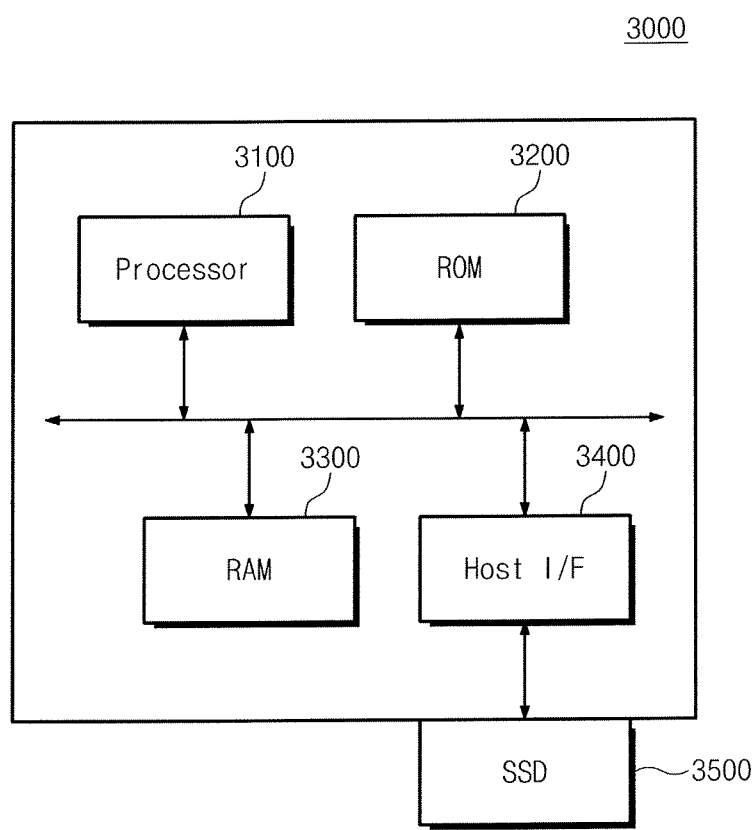
FIG. 12 is a block diagram illustrating an electronic device provided with the SSD illustrated in FIG. 10.

FIG. 12 is a block diagram illustrating an electronic device 3000 provided with the SSD 1000 illustrated in FIG. 10. Referring to FIG. 12, the electronic device 3000 includes a processor 3100, a ROM 3200, a RAM 3300, a host interface 3400 and an SSD 3500.

The processor 3100 accesses the RAM 3300 for performing a firmware code or an arbitrary code. Also, the processor 3100 accesses the ROM 3200 for performing a fixed command sequence such as an initiating command sequence and a basic input/output operation system sequence.

The host interface 3400 performs interfacing between the electronic device 3000 and the SSD 3500. The host interface 3400 includes a protocol for performing data exchange between the electronic device 3000 and the SSD 3500. Herein, the protocol may be one of various interface protocols such as a Universal Serial Bus (USB) protocol, a Multimedia Card (MMC) protocol, a Peripheral Component Interconnection (PCI) protocol, a PCI-express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, and an Integrated Drive Electronics protocol.

The SSD 3500 may be removable with respect to a housing of the electronic device 3000. The SSD 3500 may be implemented in the same manner as the SSD 1000 illustrated in FIG. 10.

The SSD 3500 may have one or more terminals (not illustrated) to be connected (or detachably attached) to one or more terminals of the host interface 3400 to communicate with each other. The terminals of the host interface 3400 may be formed on a housing of the electronic device 3000. The SSD 3500 may perform the same operation as the SSD 1100 of FIG. 10 or the SSD 2500 of FIG. 11.

The electronic device 3000 according to the inventive concept may be a cellular phone, a Personal Digital Assistant (PDA), a digital camera, a camcorder, a portable audio play device (for instance, MP3 player) and a PMP.

The electronic device 3000 according to the inventive concept stores a large amount of data into a nonvolatile memory device, i.e., the SSD 3500, and thus power consumption may be reduced. Accordingly, the electronic device 3000 according to the inventive concept is easy to carry out the required operations thereof.

Figure 13:
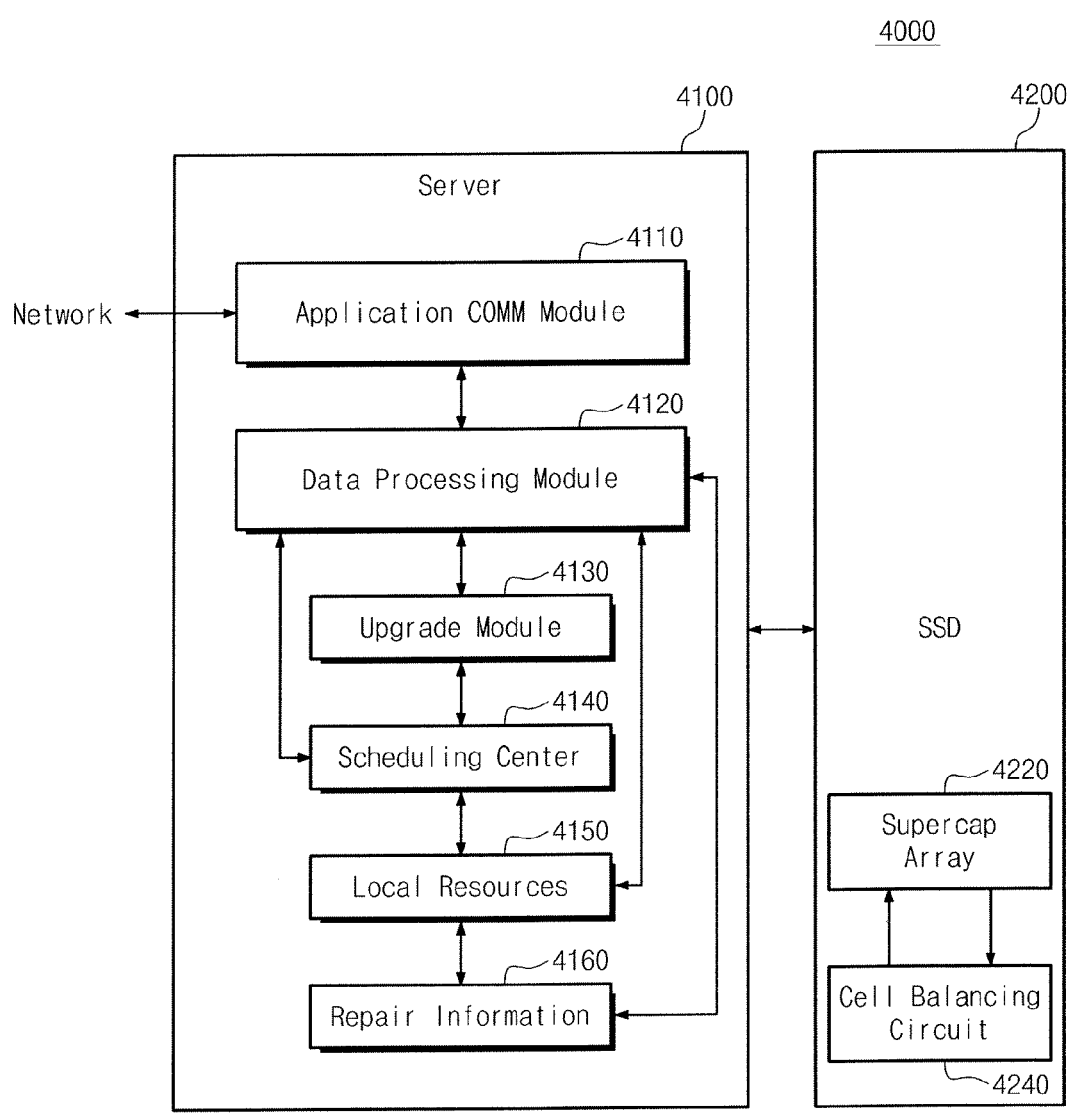
FIG. 13 is a block diagram illustrating a server system according to the inventive concept.

FIG. 13 is a block diagram illustrating a server system 4000 according to an embodiment of the inventive concept. Referring to FIG. 13, the server system 4000 includes a server 4100 and an SSD 4200 to store data needed for driving the server 4100.

The server 4100 includes an application communication module 4110, a data process module 4120, an upgrade module 4130, a scheduling center 4140, a local resource module 4150 and a repair information module 4160.

The application communication module 4110 is implemented so that the server 4100 communicates with a computing system connected to a network or with an SSD 4200. The application communication module 4110 may transmit data or information applied through a user interface to the data process module 4120.

The data process module 4120 is linked to the local resource module 4150. Herein, the local resource module 4150 offers a list of repair shops/dealers/technical information to a user based on data or information inputted to the server 4100.

The upgrade module 4130 interfaces with the data process module 4120. The upgrade module 4130 upgrades firmware, a reset code and a diagnosis system or upgrades other information to an electronic device based on data or information transferred from the SSD 4200.

The scheduling center 4140 permits an option in real time to a user based on data or information inputted to the server 4100.

The repair information module 4160 interfaces with the data process module 4120. The repair information module 4160 is used for offering information related to repair (for instance, audio, video or document file) to a user. The data process module 4120 packages related information based on information transferred from the SSD 4200. Thereafter, this information is transferred to the SSD 4200 or displayed to a user.

The SSD 4200 may be implemented with the same structure and same operation as the SSD 1000 illustrated in FIG. 10. The SSD 4200 includes a supercap array 4220 and a cell balance circuit 4240. The supercap array 4200 includes super capacitors (not shown) at least one of which is connected in series. The cell balance circuit 4240 senses a charging voltage between super capacitors connected in series of the supercap array 4200, generates a balance voltage corresponding to the sensed charging voltage, and applies the generated balance voltage between the super capacitors connected in series.

In the embodiment, the cell balance circuit 4240 may be controlled by a CPU (not shown) included in the SSD 4200. That is, the charging voltage sensing, balance voltage generation, and balance voltage applying may be controlled by the CPU included within the SSD 4200.

In another embodiment, the cell balance circuit 4240 may be controlled by the outside of the SSD 4220 (for instance, the server 4200). That is, the charging voltage sensing, balance voltage generation, and balance voltage applying may be controlled by the outside of the SSD 4200.

Since the server system 4000 according to the inventive concept is provided with the SSD 4200 whose performance of auxiliary power is improved, reliability of data may be greatly improved. Further, the server system 4000 according to the inventive concept stores data into the SSD 4200 capable of keeping data even if power is cut-off, and thus power consumption may be greatly reduced in comparison with using a Hard Disk Driver (HDD).

The memory system or storage device according to the embodiment of the inventive concept may be packaged using various types of package. In the embodiment, the memory system or storage device according to the embodiment of the inventive concept may be packaged using packages such as Package on Package (PoP), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP).

FIGS. 14 to 23 are structural diagrams illustrating a form and an arrangement of a super capacitor. The super capacitor may be implemented as various types such as a planar type, a can type, a coil type and a slot type.

Figure 14:
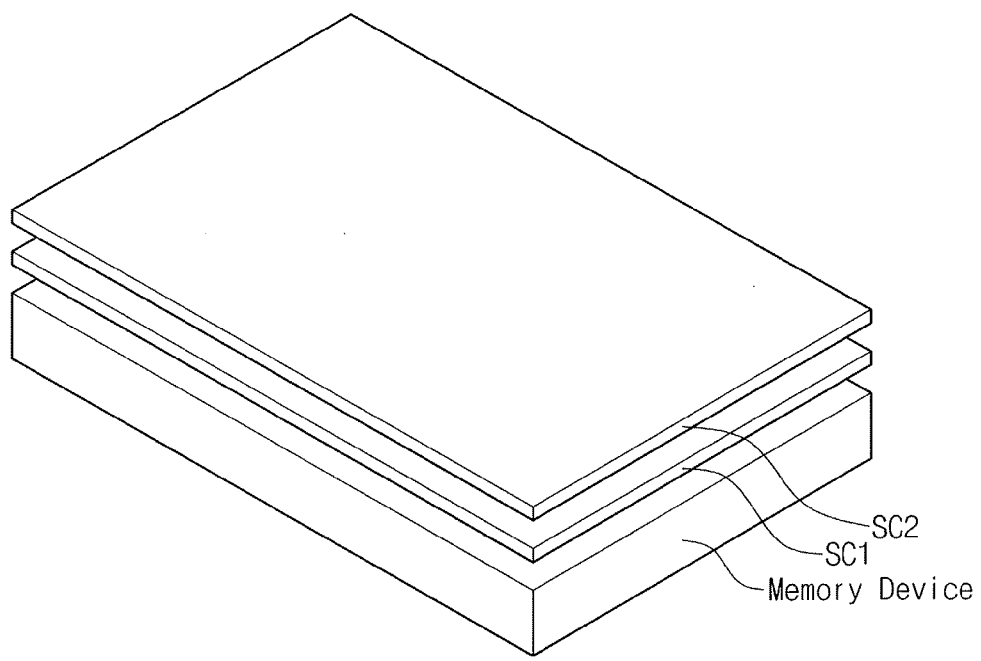
FIGS. 14 to 23 are structural diagrams illustrating a form and an arrangement of a super capacitor.
Figure 15:
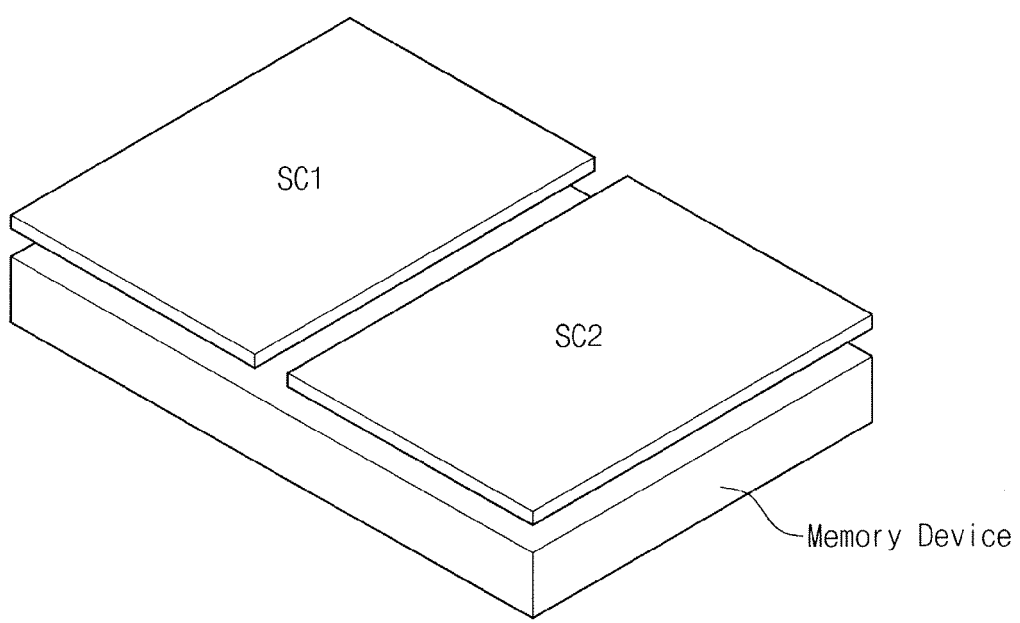
Figure 16:
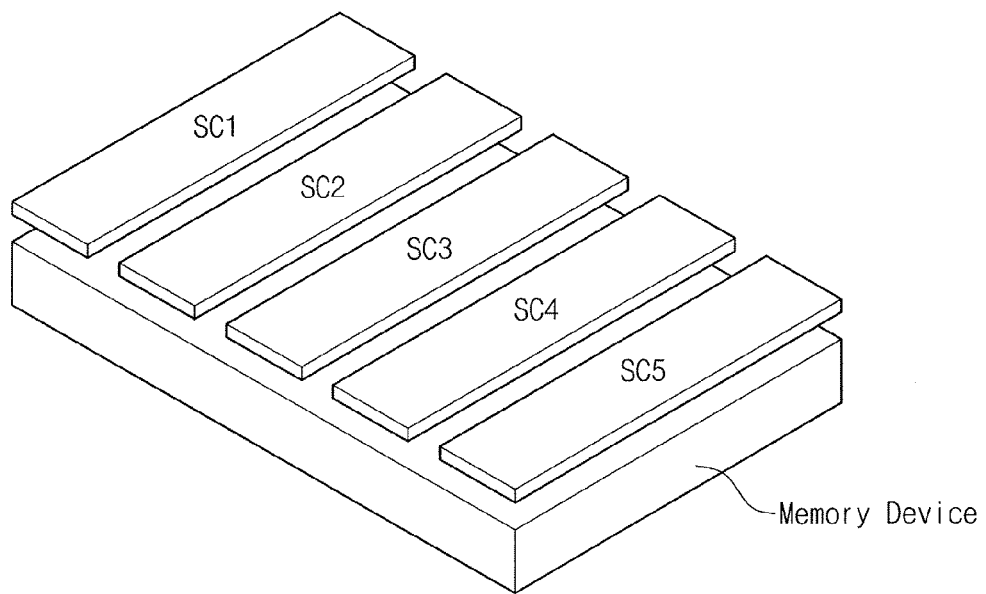
Figure 17:
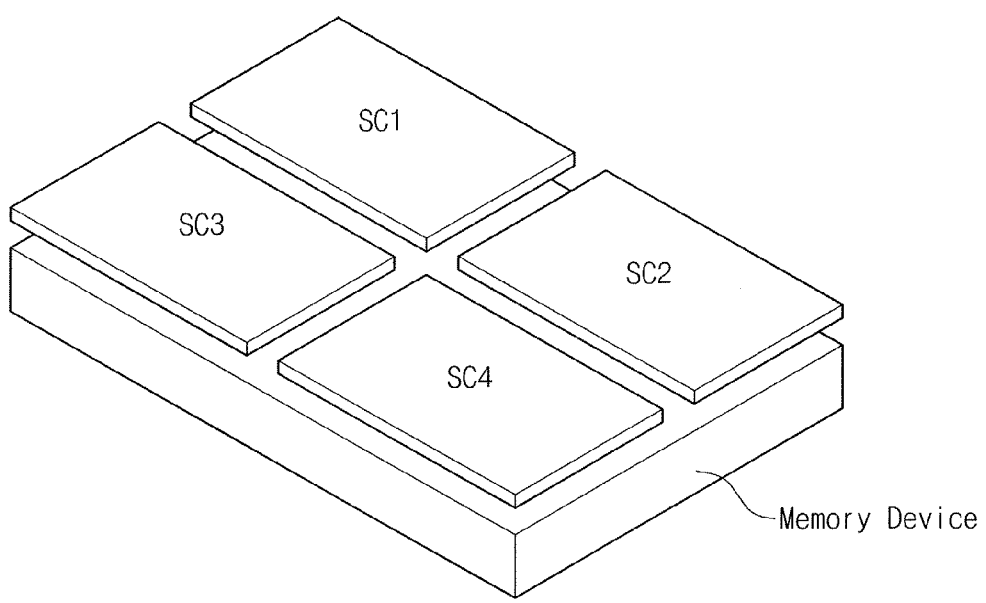
Figure 18:
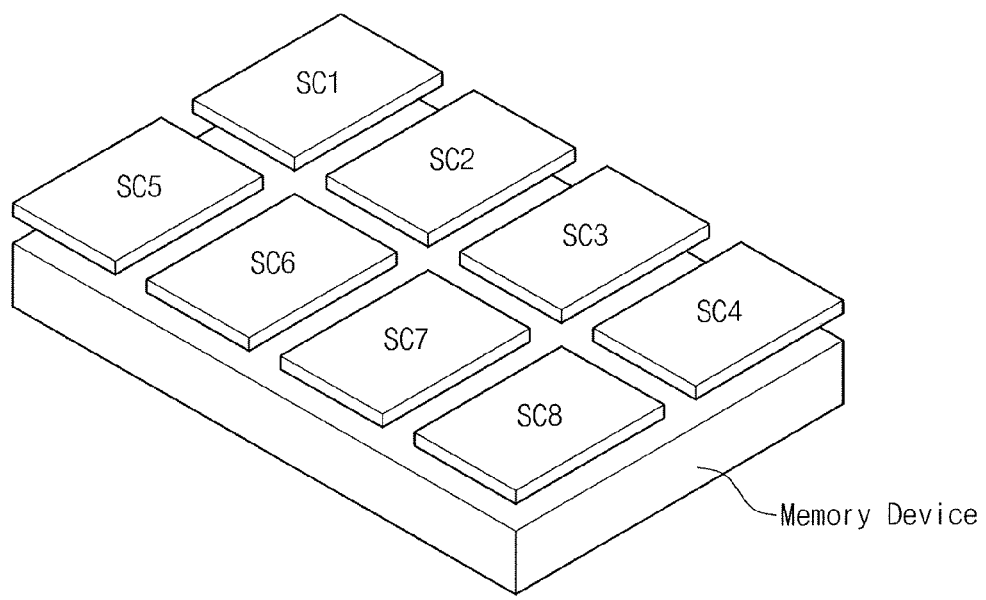
Figure 19:
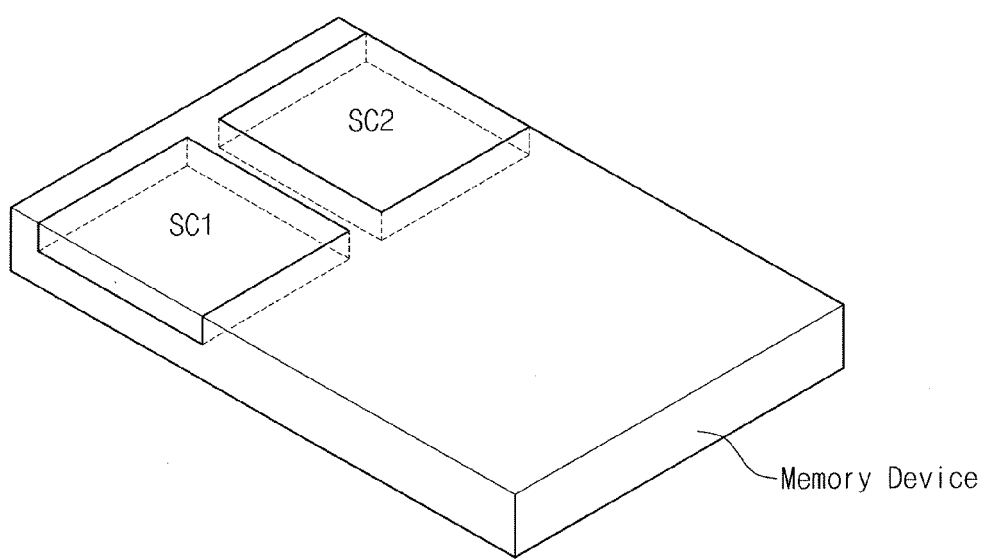

In FIGS. 14 to 19, the planar type super capacitor is exemplarily illustrated. Referring to FIG. 14, a first super capacitor SC1 is layered on a memory device in parallel. And, a second super capacitor SC2 is layered on the first super capacitor in parallel. FIGS. 15 to 18 show that a plurality of super capacitors are arranged side by side at the same plane on the memory device. The planar type super capacitor may be arranged under the memory device or left or right of the memory device besides the upper side of the memory device. Also, as illustrated in FIG. 19, it may be arranged at a groove of the memory device.

Figure 20:
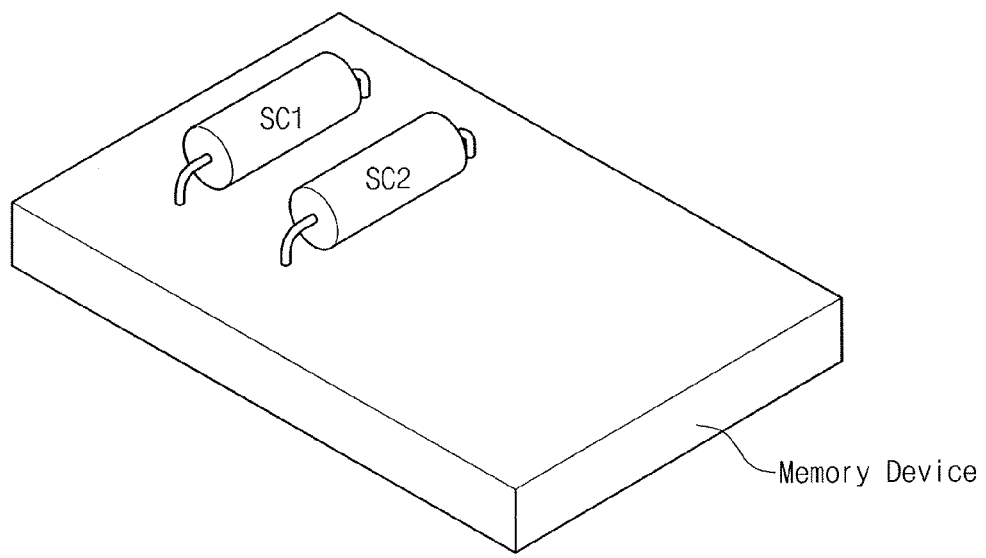
Figure 21:
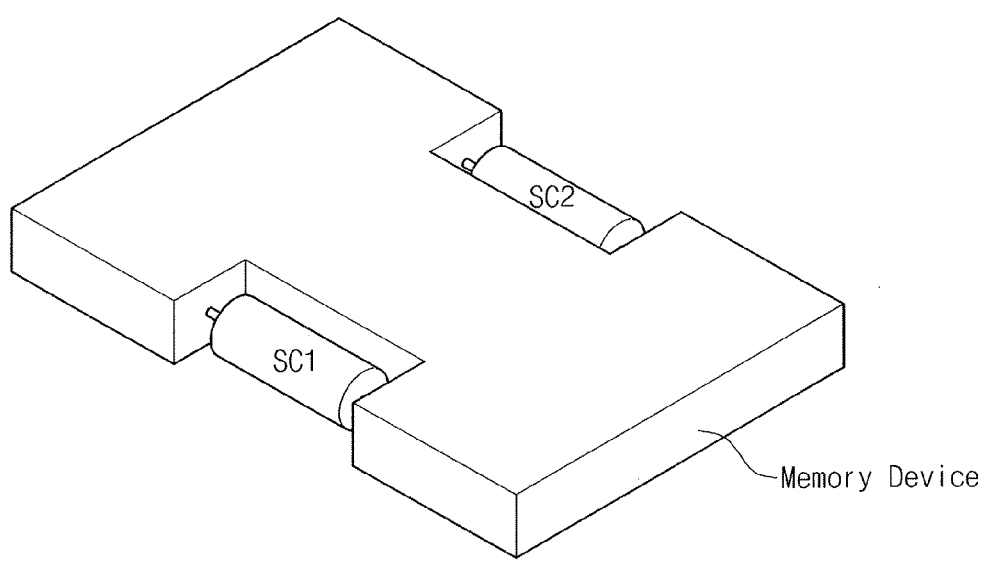

In FIGS. 20 and 21, the can type super capacitor is exemplarily illustrated. Referring to FIG. 20, first and second super capacitors SC1 and SC2 are arranged side by side on the memory device. Referring to FIG. 21, the first and second super capacitors SC1 and SC2 are arranged at grooves of both sides of the memory device. The can type super capacitor may be variously arranged besides the arrangement illustrated in FIGS. 20 and 21.

Figure 22:
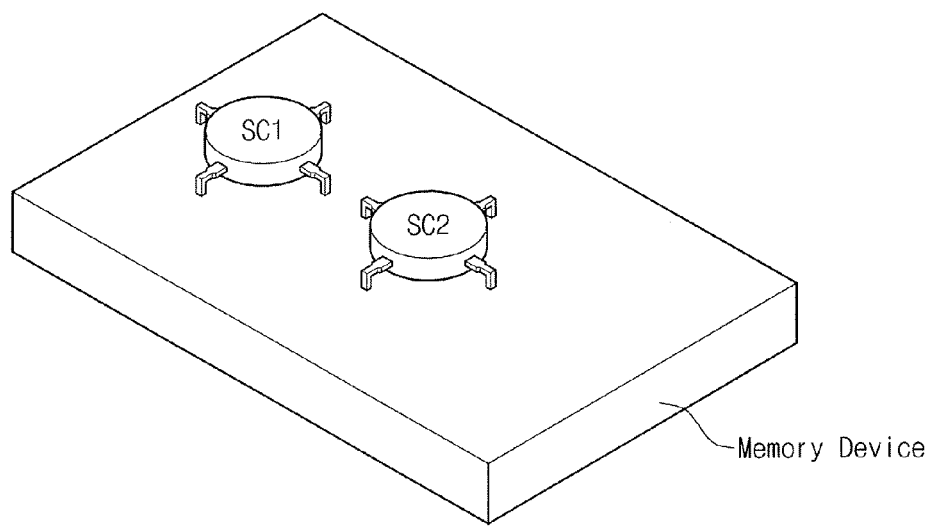

In FIG. 22, the coil type super capacitor is exemplarily illustrated. Referring to FIG. 22, first and second super capacitors SC1 and SC2 are arranged side by side on the memory device.

Figure 23:
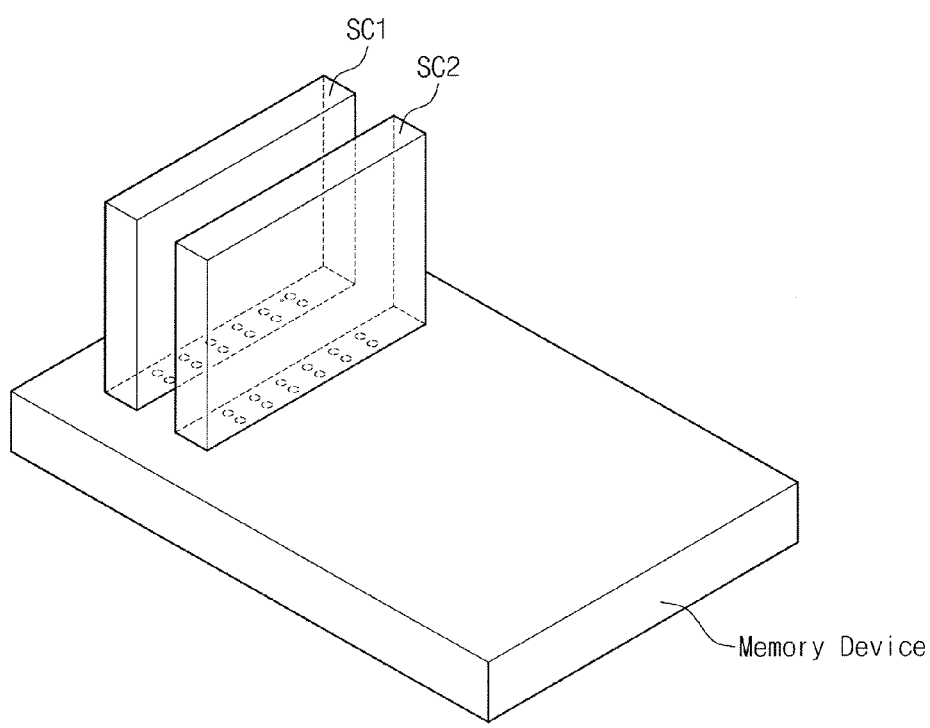

In FIG. 23, the slot type super capacitor is exemplarily illustrated. The slot type super capacitors are removable.

As above-described, the auxiliary power device according to the inventive concept is provided with the microprocessor which controls the cell balance circuit for diagnosing and managing the auxiliary power source having the charging cells at least one of which is connected in series, and thus degradation degrees of the charging cells are equally maintained so that the life can be extended.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:
1. A power storage apparatus comprising:
    a first capacitor and a second capacitor which are connected in series; and
    a controller configured to apply a balance voltage to adjust a charging voltage between the first capacitor and the second capacitor, the controller comprising:
        a converter configured to convert the charging voltage into a digital signal; and
        a balance voltage generator configured to generate the balance voltage according to the digital signal,
    wherein the balance voltage is determined based on the charging voltage and is applied to a node between the first capacitor and the second capacitor,
    wherein the controller is configured to determine an open state or a short state of at least one of the first capacitor and the second capacitor based on the charging voltage, and to apply the balance voltage to the node between the first capacitor and the second capacitor, wherein the controller further comprises a voltage follower to receive the balance voltage from the balance voltage generator and to output the balance voltage to a node between the first capacitor and the second capacitor, and wherein the voltage follower comprises:

an operational amplifier to output the balance voltage according to the charging voltage and a feedback voltage from a node between the first capacitor and the second capacitor;

a resistor to restrict a current flowing into the node; and a switch connected between the resistor and the node to output the balance voltage according to an activation signal.

2. The apparatus of claim 1, wherein the controller determines characteristics of the first capacitor and the second capacitor according to the charging voltage and generates the balance voltage according to the determined characteristics of the first capacitor and the second capacitor.

3. The apparatus of claim 1, wherein:

the first capacitor and the second capacitor are connected between a first potential and a second potential; and the balance voltage is less than or equal to half of a difference between the first potential and the second potential.

4. The apparatus of claim 1, wherein:

the charging voltage comprises a first charging voltage indicating a first degradation of the first capacitor and a second charging voltage indicating a second degradation of the second capacitor; and the controller determines the balance voltage between the first charging voltage and the second charging voltage.

5. The apparatus of claim 1, wherein:

the charging voltage represents a degradation state of at least one of the first capacitor and the second capacitor; and the balance voltage is a voltage defined according to a non-degradation state of the first capacitor and the second capacitor.

6. The apparatus of claim 1, wherein the controller determines the balance voltage according to a variation of the charging voltage with respect to at least one of a reference voltage and a time axis.

7. The apparatus of claim 1, wherein the charging voltage is detected when the first capacitor and the second capacitor are charged or a period of time after the first capacitor and the second capacitor have been charged.

8. The apparatus of claim 1, wherein:

the charging voltage comprises a first charging voltage detected when charging of the first capacitor and the second capacitor is completed, and a second voltage detected a predetermined time after charging of the first capacitor and the second capacitor has been completed; and the controller determines the balance voltage according to a relationship between the first charging voltage and the second voltage.

9. The apparatus of claim 1, wherein the controller includes a lookup table representing a relationship between the balance voltage and the charging voltage, and determines the balance voltage according to the lookup table.

10. The apparatus of claim 1, wherein the charging voltage varies according to variable characteristics of the first capacitor and the second capacitor, and the controller determines the balance voltage according to a variable charging voltage.

11. The apparatus of claim 1, wherein at least one of the first capacitor and the second capacitor comprises a super capacitor array.

12. The apparatus of claim 1, wherein at least one of the first capacitor and the second capacitor has a capacity between 1 F and 20 F inclusive.

13. The apparatus of claim 1, wherein the controller generates the balance voltage as a capacitor balancing voltage applied to a node between the first capacitor and the second capacitor.

14. The apparatus of claim 1, wherein the controller outputs a signal indicating a characteristic of at least one of the first capacitor and the second capacitor according to a level of the charging voltage.

15. The apparatus of claim 14, wherein the characteristic comprises a first characteristic representing a first error of the first capacitor according to the level of the charging voltage with respect to a first reference level and a second characteristic representing a second error of the second capacitor according to the level of the charging voltage with respect to a second reference level.

16. The apparatus of claim 1, wherein:

the first capacitor and the second capacitor are connected between a potential difference; and the controller generates the balance voltage lower than a half of the potential difference when the charging voltage is higher than the half of the potential difference such that the lower balance voltage is applied to a node between the first capacitor and the second capacitor.

17. The apparatus of claim 1, wherein:

the first capacitor and the second capacitor are connected between a potential difference; and the controller generates the balance voltage higher than a half of the potential difference when the charging voltage is lower than the half of the potential difference such that the higher balance voltage is applied to a node between the first capacitor and the second capacitor.

18. The apparatus of claim 1, wherein the controller generates the balance voltage higher than the charging voltage when the charging voltage is lower than a first reference voltage, and the controller generates the balance voltage lower than the charging voltage when the charging voltage is higher than a second reference voltage.

19. The apparatus of claim 1, wherein the controller determines a time to apply the balance voltage to a node between the first capacitor and the second capacitor.

20. The apparatus of claim 1, wherein the controller generates the balance voltage when the charging voltage is within a first range, and outputs a signal indicating a characteristic of at least one of the first capacitor and the second capacitor when the charging voltage is within a second range.

21. The apparatus of claim 20, wherein the second range may be below the first range or above the first range according to status of the first capacitor and the second capacitor.

22. The apparatus of claim 20, wherein the balance voltage is not applied to a node between the first capacitor and the second capacitor when the charging voltage is within the second range.

23. The apparatus of claim 1, wherein the balance voltage generator comprises a second converter to convert the signal to a second digital signal such that the controller generates the balance voltage according to the second digital signal.

24. The apparatus of claim 1, wherein the balance voltage generator comprises a digital potentiometer.

25. An electronic apparatus comprising:

a power storage apparatus comprising a first capacitor and a second capacitor connected in series, and a controller configured to apply a balance voltage to adjust a charging voltage between the first capacitor and the second capacitor such that the first capacitor and the second capacitor output an output voltage, the controller comprising:
 a converter configured to convert the charging voltage into a digital signal; and
 a balance voltage generator configured to generate the balance voltage according to the digital signal;
a booster to boost the output voltage;
a voltage regulator to receive the boosted output voltage to generate a power voltage to operate the power storage apparatus; and
a processor to control the power storage apparatus,
wherein the balance voltage is determined based on the charging voltage and the controller applies the balance voltage to a node between the first capacitor and the second capacitor,
wherein the processor is configured to determine an open state or a short state of at least one of the first capacitor and the second capacitor based on the charging voltage,
wherein the controller further comprises a voltage follower to receive the balance voltage from the balance voltage generator and to output the balance voltage to a node between the first capacitor and the second capacitor, and wherein the voltage follower comprises:
 an operational amplifier to output the balance voltage according to the charging voltage and a feedback voltage from a node between the first capacitor and the second capacitor;
 a resistor to restrict a current flowing into the node; and
 a switch connected between the resistor and the node to output the balance voltage according to an activation signal.

26. The apparatus of claim 1, wherein the controller is further configured to convert the charging voltage detected at the node into digital data and determine the balancing voltage based on the digital data.

27. The apparatus of claim 26, wherein the controller is further configured to determine whether to generate the balance voltage according to the digital data.

28. The apparatus of claim 1, further comprising:
a charging circuit configured to apply a constant voltage to a first terminal of the first capacitor to charge the first and second capacitors, the second capacitor including a second terminal connected to the node,
wherein the controller is further configured to detect the charging voltage at the node and to apply the balance voltage to the node.

* * * * *